(12) United States Patent
Okano et al.

(10) Patent No.: US 6,373,968 B2
(45) Date of Patent: Apr. 16, 2002

(54) SYSTEM FOR IDENTIFYING INDIVIDUALS

(75) Inventors: Kenji Okano; Yuji Kuno, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/090,905

(22) Filed: Jun. 5, 1998

(30) Foreign Application Priority Data

Jun. 6, 1997 (JP) ............................................. 9-165117
Jun. 18, 1997 (JP) ............................................. 9-177664
Jul. 4, 1997 (JP) ............................................. 9-180047

(51) Int. Cl.[7] ................................................ G06K 9/00
(52) U.S. Cl. ..................................................... 382/117
(58) Field of Search ................................ 382/110, 115, 382/116, 117–118, 124–125, 209, 216, 217, 218

(56) References Cited

U.S. PATENT DOCUMENTS 4,641,349 A * 2/1987 Flom et al. .................. 382/117
5,291,560 A 3/1994 Daugman .................... 351/206
6,081,607 A * 6/2000 Mori et al. .................. 382/117
6,144,754 A * 11/2000 Okano et al. ................ 382/117
6,151,403 A * 11/2000 Luo ............................ 382/117

OTHER PUBLICATIONS

U.S. Application No. 09/046,506 filed Mar. 24, 1998.
U.S. Application No. 09/047,482 filed Mar. 25, 1998.
U.S. Application No. 09/048,180 filed Mar. 26, 1998.
U.S. Application No. 09/049,073 filed Mar. 27, 1998.

* cited by examiner

*Primary Examiner*—Bhavesh Mehta

(57) ABSTRACT

A system for identifying individuals, which easily reveals the cause of misjudgment when it occurred, wherein individual identification means 4 identifies an individual by comparing an input image with a recognition dictionary 2, wherein identification result analysis means 6 analyzes an identification result of the individual identification means 4, and detects that portion of a region, used for identification, of the input image, which differs from the recognition dictionary 2, wherein result output control means 5, if an analysis result of the identification result analysis means 6 is that the input image differs from the dictionary image for the most part, directs only the input image to be displayed, and if the identification result is that the input image partially differs from the dictionary image, directs at least the input image and also the discordant portion to be displayed.

8 Claims, 22 Drawing Sheets

| No | NAME | SEX | IRIS CODE |
|---|---|---|---|
| 1 | USER A | MALE | 010100110101··· |
| 2 | USER B | FEMALE | 111100100100··· |
| 3 | USER X | MALE | 100110101001··· |
| ⋮ | ⋮ | ⋮ | ⋮ |

| No | IMAGE AT DICTIONARY GENERATION | |
|---|---|---|
| 1 |  | ←—USER A |
| 2 |  | ←—USER B |
| 3 |  | ←—USER X |
| ⋮ | ⋮ | |

| SUB DIVISONS | HAMMING DISTANCE |
|---|---|
| 1 | 0.4312 |
| 2 | 0.1925 |
| 3 | 0.3908 |
| 4 | 0.2423 |
| ⋮ | ⋮ |
| 32 | 0.1832 |

| ID-No. | NAME | IRIS CODE | ADDITIONAL INFORMATION ||||  |
|---|---|---|---|---|---|---|---|
| | | | SEX | COLOR | TAIL | COLOR OF EYE | |
| 1 | TARO | 010100110101··· | MALE | WHITE | LONG | BLACK | ----- |
| 2 | JIRO | 111100100100··· | MALE | BROWN | SHORT | BLACK | ----- |
| 3 | HANAKO | 100110101001··· | FEMALE | BLACK | LONG | BROWN | ----- |
| ⋮ | ⋮ | ⋮ | ⋮ | ⋮ | ⋮ | ⋮ | |

| ID-No. | HAMMING DISTANCE |
|---|---|
| 1 | 0.4801 |
| 2 | 0.3921 |
| 3 | 0.1908 |
| ⋮ | ⋮ |

| HORSE COLORS (JAPANESE) | FUR COLOR | LONG HAIR | FOUR-LEG LOWER PORTION | EYE PERI-PHERY | UNDER-ARM | BELLY | NOSE PERI-PHERY |
|---|---|---|---|---|---|---|---|
| TOCHI-KURIGE | BLACK-YELLOWISH BROWN (NOT BLACK) | DARK TO WHITISH FUR COLOR (A) | | | | | |
| KAGE | LIGHT TO DARK YELLOWISH BROWN | BLACK | BLACK | | | | |
| KURO-KAGE | BLACK-REDDISH BROWN | BLACK | BLACK | BROWN | BROWN | BROWN | |
| AO-KAGE | BLACK | BLACK | | BROWN | | | |
| AOGE | BLACK | BLACK | | | | | |
| ASHIGE | MIXED WITH WHITE | | | | | | BROWN |
| KURIGE | YELLOWISH BROWN | DARK TO WHITISH FUR COLOR (A) | | | | | |

FIG. 16

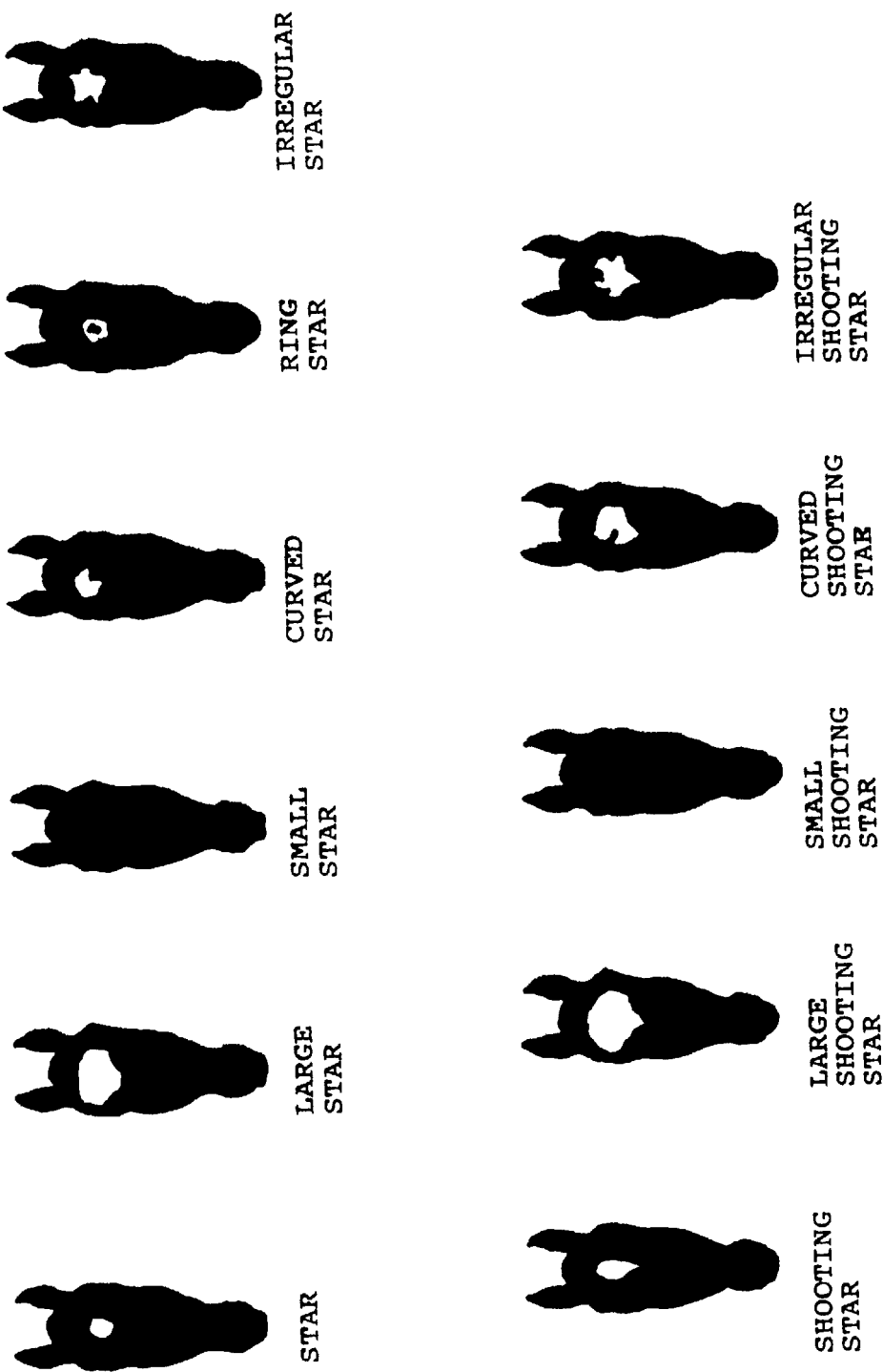

Fig. 20(a)
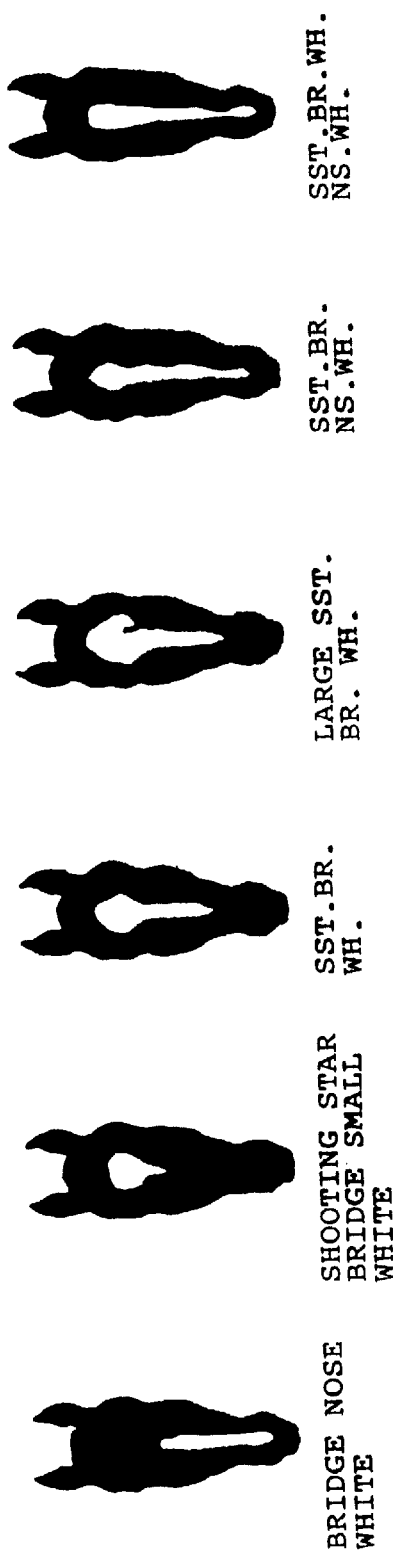
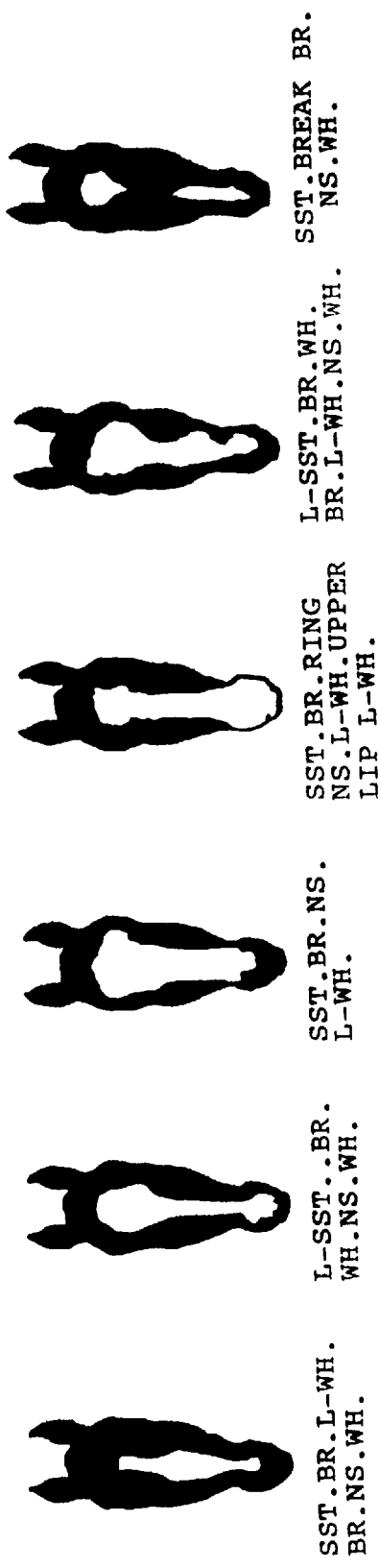

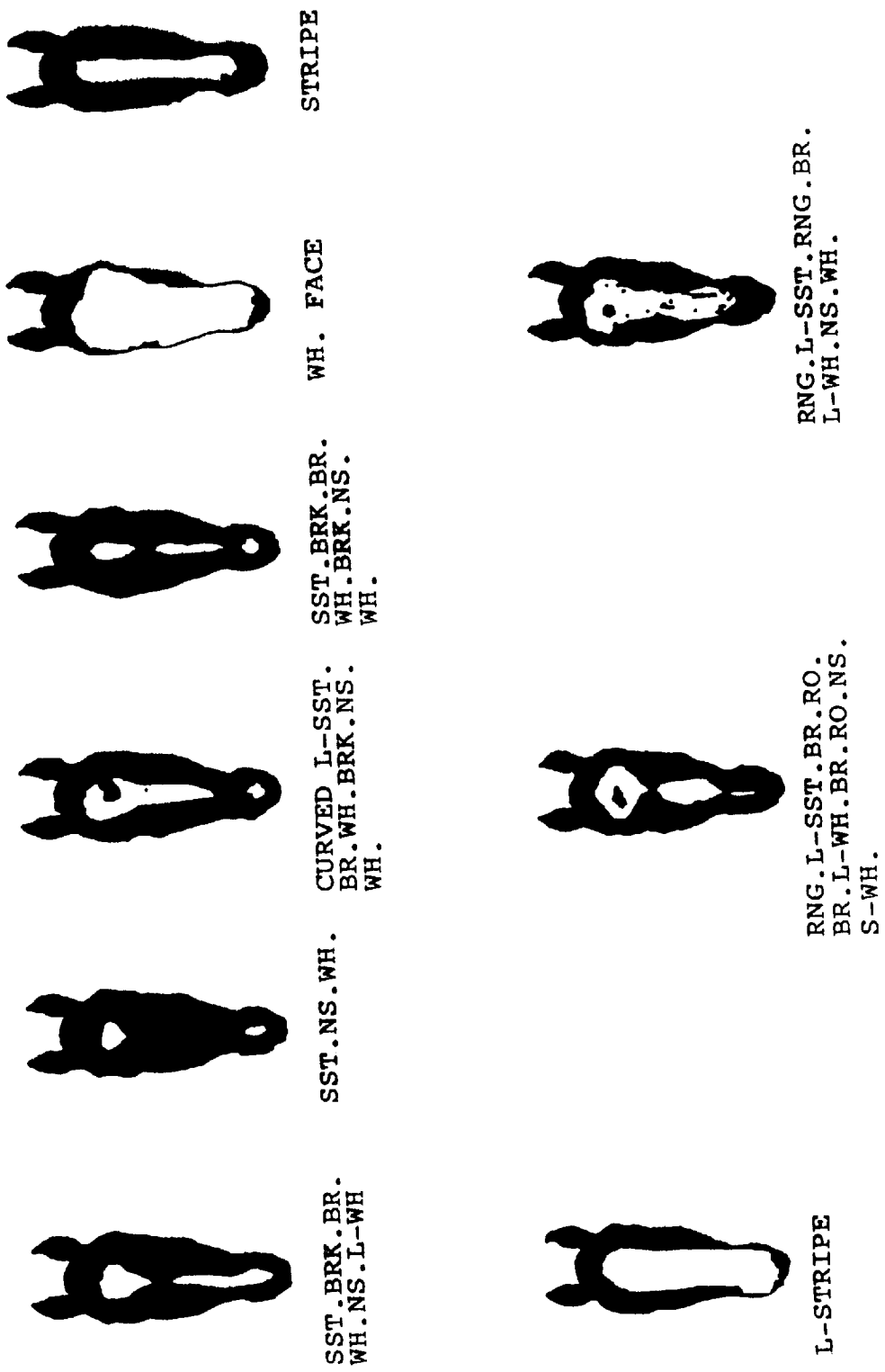

| NAMES OF WHITE PATTERNS | LOCATION | WHITE PATTERN DATA ||||||
|---|---|---|---|---|---|---|
| | | SIZE | NUMBER | SHAPE | CENTER OMISSION | WIDTH |
| STAR, LARGE STAR, SMALL STAR | FOREHEAD | ○ | | ○ (CIRCULAR) | ○ (NO) | |
| CURVED STAR, IRREG STAR, SHOOTING STAR, LARGE SHOOTING STAR, SMALL SHOOTING STAR, CURVED LARGE SHOOTING STAR, IRREG LARGE SHOOTING STAR, | FOREHEAD | ○ | ○ | ○ | ○ (NO) | |
| RING STAR | FOREHEAD | | | | ○ (YES) | |
| BRIDGE WHITE, BRIDGE LARGE WHITE, BRIDGE SMALL WHITE, | BRIDGE | | | | | ○ |
| NOSE WHITE, NOSE LARGE WHITE, NOSE SMALL WHITE | NOSE | ○ | | | | |
| LIP WHITE, UPPER LIP WHITE, LOWER LIP WHITE, LIP SMALL WHITE, LIP LARGE WHITE | LIP | | | | | ○ |
| STRIPE, LARGE STRIPE, THIN STRIPE | FOREHEAD TO NOSE | ○ (SMALL) | | | | ○ (NARROW) |
| WHITE FACE | FOREHEAD TO NOSE | ○ (LARGE) | | | | ○ (WIDE) |

| WHIRLS LOCATION | NAMES OF WHIRL (JAPANESE) | WHIRLS LOCATION | NAMES OF WHIRL (JAPANESE) |
|---|---|---|---|
| 61 | SHUMOKU | 71 | HAKUSEI |
| 62 | KESOU | 72 | OSAE |
| 63 | HOHO-TSUJI | 73 | ABUMI-BANA |
| 64 | KUTSUWA-GARAMI | 74 | SHOCHI |
| 65 | FUE-GARAMI | 75 | SHIBAHIKI |
| 66 | KAMINAKA | 76 | BASHO |
| 67 | KUBINAKA | 77 | KOTSUSEI |
| 68 | NAMIWAKE | 78 | USHIRO-SOUMON |
| 69 | SOUMON | 79 | SARUNOBORI |
| 70 | ROUMON | | |

| NAMES OF WHITE MARKS | WHITE MARK LOCATION | WHITE MARK SIZES ||||
|---|---|---|---|---|---|
| | | SIZE | LENGTH | WIDTH | CIRCUMFERENCE LENGTH |
| TINY WHITE, SMALL WHITE | HDOF | O | | | |
| HALF WHITE, WHITE | CANNON | | O | O | O |
| LONG WHITE, THIN WHITE, LONG HALF WHITE | CANNON | | O | O | O |

FIG. 27

| HORSE NAME | FEATURES |
|---|---|
| ABCDEF | CHESTNUT, SHUMOKU, NOSE-BRIDGE WHITE, RIGHT-FRONT SMALL WHITE |
| ----- | -------- |
| ----- | -------- |

SYSTEM FOR IDENTIFYING INDIVIDUALS

BACKGROUND OF THE INVENTION

1. Field of the Invention

The present invention relates to a system for identifying individuals by comparing an input image with a dictionary image previously stored.

2. Related Art

A technology is well known by which an individual is identified from physical information (about the face, iris and fingerprints, for example) of human beings and other animals. To cite an example, this technology is disclosed in U.S. Pat. No. 5,291,560.

In the technology revealed in the above literature, the image of the iris of an eye of a human being is converted into codes of 0 and 1, and the codes are stored as a dictionary. In an actual identification process, an input iris image is converted into codes of 0 and 1, and the codes are compared with codes stored in the dictionary to establish the identity of an individual.

By the conversion of an input image into codes of 0 and 1, the amount of processing can be reduced, which leads to savings of storage capacity. In the identification of an individual by fingerprints, too, it is ordinary to detect the features from an input image, and store only data on the features as a dictionary. Likewise, in the identification of an individual by a face image, the amount of information is reduced by the use of mosaic images or the facial features.

In the conventional technology mentioned above, however, the input image is converted into codes of 0 and 1 or information about the facial features. Therefore, if the system should make an error in understanding data, it is difficult for a user without specialized technical knowledge to find the cause of the problem, the system will be a burden for the user to deal with.

To take an identification system using the face as an example, if a smiling face is registered when a dictionary is created and a serious face is input in the actual operation of the system, the system may mistake this as a discrepancy in the comparison step. On the other hand, if days passed from the registration till the identification operation and the user forgot his or her facial expression on the day of registration, it is impossible to conduct identification by simply displaying the registered image and the input image for comparison, with the result that it is impossible to decide whether the identification itself is correct or wrong.

In a system which has images at the time of dictionary creation stored in advance, if a misidentification occurred, even when the stored image at issue is displayed, it takes time until you can find that region from the image of the whole face which was conducive to the misidentification.

Accordingly, it has long been desired that a system should be developed which enables the user to find the cause of the misjudgment even when misidentification occurred.

With a system for identifying individuals by the prior art mentioned above, when this system is applied to identification of animals, such as dogs, cats or horses, a problem arises as follows.

Animals are different from human beings and you cannot expect them to behave in a manner favorable to the system. For example, when taking a picture of the iris of the eye with a video camera, a person is at a standstill squarely facing the camera. However, in the case of an animal, it does not look at the camera, and the face is moving most of the time.

Therefore, in the identification of animals, the images taken are inferior in picture quality, which is often responsible for a failure of identification. For this reason, it was necessary to take images repeatedly.

In this respect, it has been expected that a system for identifying individuals should be created which can identify an individual even when the image obtained does not have a good picture quality.

To solve this problem, the present invention adopts the following arrangement.

SUMMARY OF THE INVENTION

According to a first aspect of the invention, a system for identifying individuals comprises:

an image memory means for storing an input image of a individual as an object to be identified;

a dictionary for having data on the features of collation objects stored in advance;

a dictionary image memory means for storing dictionary images as a basis on which to extract data on the features of the collation objects;

an individuals identification means for analyzing the input image held in the image memory means and comparing said data on the features stored in the dictionary to thereby identify the individual;

an identification result analysis means for analyzing the identification result by the individuals identifying means and detecting that area of the region used for identification in the input image which does not agree with the dictionary data;

a result output control means for, according to identification result by the individuals identifying means, issuing an analyze command to the identification result analysis means and, according to analysis result by the identification result analysis means, issuing a command to display the discordant portion to the identification result analysis means, and deciding whether or not to display the input image and the dictionary image;

an image output control means for, according to a result of decision by the result output control means, controlling display of the discordant portion, the input image and the dictionary image; and a display for displaying an image outputted by the image output control means.

With regard to the first aspect, the input image and the dictionary image are images of the iris of the human eye, and the individuals identifying means conducts identification by comparing iris codes. However, any arrangement other than was described above may be applied so long as it identifies an individual.

With continuing reference to the first aspect, the identification result analysis means detects an area where the input image does not coincide with the dictionary image by comparing iris codes, for example. The result output control means makes a decision to have at least where the discrepancy occurred displayed according to an analysis result of the identification result analysis means.

By this operation of the first aspect, even if the identity of the person is not established, where the discrepancy occurred is displayed, so that it is possible for the user to easily guess the cause of misjudgment.

It may be provided that, if the input image agrees with the dictionary data to such an extent that the identification result of the individuals identifying means is larger than a predetermined threshold value, the result output control means makes a decision not to issue an analyze command to the identification result analysis means nor issue a display command to the image output control means.

The rationale is that, if the input image agrees with the dictionary data to such an extent that the identification result of the individuals identifying means is larger than the predetermined threshold value, this means that the person is identified as a correct person. In this case, the system does not display analysis of the identification result nor display the input image. Therefore, unnecessary processing is not executed and a reduction of processing load can be expected.

It may be provided that, if the input image agrees with the dictionary data to such an extent that the identification result of the individuals identifying means is higher than the predetermined first threshold value but the amount of agreement is smaller than a second threshold value, which is smaller than the first threshold value, the result output control means makes a decision not to issue an analyze command to the identification result analysis means nor issue a display command to the image output control means.

Here, the analyze process and the image display process are not executed when the person is identified as a correct person or the person is identified as somebody else or the quality of the input image is judged to be inferior, and the analyze process and the image display process are executed only when the identity of the person is uncertain. The cases where the degree of agreement between the input image and the dictionary data is less than the second threshold value include a case of no agreement at all.

By this arrangement, unnecessary processing can be omitted and security can be secured even if a different person in bad faith attempts to use the system.

If the identification result analysis means analyzes and judges the discordant portion between the input image and the dictionary image to be larger than the predetermined value, it may be provided that the result output control means judges that the input image, for the most part, differs from the dictionary image and makes a decision to cause the input image to be displayed.

The upshot of this is that according to the result of the analyze process by the identification result analysis means, if the result output control means judges that the input image, for the most part, differs from the dictionary data, only the input image is displayed. In other words, in this case, the dictionary image is not displayed. Therefore, if the image is out of focus or blurred, the user can easily guess the cause of misjudgment by looking at the input image. Furthermore, even when an ill-intentioned person tries to use the system, security can be maintained.

According to a second aspect of the invention, system for identifying individuals comprises:

an image memory means for storing an input image of an individual to be identified;

a dictionary for having data on the features of collation objects stored in advance;

a dictionary image memory means for storing dictionary images as a basis on which to extract data of the features of the collation objects;

an individuals identifying means for analyzing the input image held in the image memory means and comparing the data on the features of the dictionary to thereby identify the individual;

an identification result analyzing means for analyzing the identification result by the individuals identifying means and detecting that area of the region used for identification in the input image which does not agree with the dictionary data; and a result output control means for making a decision not to display any image on the basis of a judgment that the input image, for the most part, differs from the dictionary data if the discordant person is larger than a predetermined value in the analysis of the identification result analysis means.

The upshot of the second aspect is that as the result of the analyze process by the identification result analysis means, if a decision is made that the input image, for the most part, differs from dictionary data, no image is displayed. In this case, for example, when an ill-intentioned person tries to access the system, security is preserved because no input image is displayed and it is least likely to be known how identification of an individual is carried out. This invention is suitable for cases where emphasis is placed on the preservation of security.

It may be provided that the result output control means makes a decision to cause both the input image and the discordant portion to be displayed if it is judged in the analysis by the identification result analysis means that the input image partially differs from the dictionary image when the discordant portion is smaller than a predetermined value.

The upshot of this is that both the discordant portion and the input image are displayed in cases of identification by the iris in which the input image is a correct person's but there is a partial difference between the input image and dictionary data when the iris is hidden behind the eye lid or eyelashes or light is reflected by the eye to the camera. Thus, the above images serve as an effective clue by which to guess the cause of misjudgment by the user. If an operator attends the system, he can make a final decision on the basis of the above images.

It may be provided that the result output control means makes a decision to cause only the discordant portion to be displayed on the ground that the input image partially differs from dictionary data when the discordant portion is smaller than a predetermined value in the analysis by the identification result analysis means.

The upshot of this is that only the discordant portion is displayed, instead of displaying both the input image and the discordant portion. This offers an effective clue by which to guess the cause for the user to be unable to make a correct apprehension. If an operator attends the system, the above images serve as a basis on which he makes a final decision.

It may be provided that the object to be identified is the iris in the eye. Thus, individuals can be identified by collation of iris images. Furthermore, it is possible to guess the cause of a misidentification, such as the iris being hidden behind the eyelid or eyelashes or the reflection of light by the eye to the camera which hampers identification even when an input image or a correct person is used.

According to a third aspect of the invention, a system for identifying individuals comprises:

a recognition dictionary for having stored in advance data on features of an object to be identified and additional information peculiar to the object obtained from the object to be identified;

an individuals identifying means for identifying an individual by comparing the data on features of the object to be identified with data on features of the dictionary data;

an identification result decision means for, when having made a decision not to input additional information in a decision regarding whether or not to input additional information according to identification result by the individuals identifying means, outputting identification result by the individuals identifying means as a final result, or, when having made a decision to input additional information, issuing a command to obtain additional information and also a command to conduct a re-identification process according to a result of the re-identification process, and making a decision to terminate the re-identification process according to a result of the re-identification process, and outputting a final identification result;

an additional information inputting means for obtaining arriving additional information upon receiving additional information from the identification result decision means; and a re-identification means for, on receiving a command to conduct a re-identification process from the identification result decision means, selecting the identification dictionaries containing all of additional information acquired by additional information inputting means, and outputting as the result of re-identification a dictionary having a closest possible value to data on the features of the object under identification among selected dictionaries.

With regard to the third aspect, the individuals to be identified may be human beings or animals, such as dogs, cats and horses. And, individuals of any other kind may be identified. Among the methods for identifying individuals, there is the iris identify process using the iris of the eye. However, any other method may be used. Furthermore, additional information is about the external features of the object under identification, such as the distinction of sex, the color of the eye, etc. Any other kind of information, such as audio information, may be used so long as individuals have a peculiar and common feature.

With continuing reference to the third aspect, the individuals identifying means conducts an identification process on an individual, the results of which are outputted to the identification result decision means. When the individual is identified as a correct individual according to the identification result of the individuals identifying means, the identification result decision means outputs this information as the final identification result. On the other hand, if the individual is not identified as a correct individual, the re-identification command is issued which is added with additional information. Additional information input means obtains additional information entered by the user or operator, and on the basis of this information, the re-identification means executes a re-identification process. By using the re-identification result by the re-identification means, the identification result decision means, if accordingly the individual could be identified, for example, outputs a decision to terminate the re-identification process along with a final identification result.

Therefore, even if the identification of the individual failed in the individual identification process, re-identification is performed focusing on certain dictionaries by using additional information, so that identification of an individual is still possible even when an obtainable image has a poor picture quality.

It may be provided that the dictionary has a number of different items of additional information stored in advance, and that the re-identification means conducts a re-identification process each time it receives one item of additional information obtained by additional information input means.

The upshot of this is that additional information may be a plurality of items of information, such as the distinction of sex, the hair color, and the re-identification means may conduct a re-identification process each time it receives one item of additional information. Therefore, the re-identification process can be carried out even if all items of information are supplied, and superfluous input operations need not be performed.

It may be provided that the identification result decision means makes a decision to terminate the re-identification process each time the re-identification means conducts a re-identification process.

The upshot of this is that a decision may be made to terminate the re-identification process each time one item of additional information is input. Therefore, when the person has been identified by input of any additional information, it is not necessary to any more re-identification process, so that time spent for identification can be shortened.

It may be provided that the identification result decision means changes a criterion for re-identification at each execution of the re-identification process by the re-identification means.

The upshot of this is that the threshold value may be varied to ease the criterion, for example, at each re-identification process. Therefore, it becomes possible to enhance the probability of successful identification of an individual while suppressing a deterioration of identification accuracy.

It may be provided that the identification of an individual is by collation of iris images and that the additional information is about the external features of the individual.

The upshot of this is that the process for identifying an individual is done by collation of iris images and additional information is about the external appearance of an individual under identification. Therefore, even if an obtained image of the eye is inferior in picture quality, identification may succeed. Because the additional information is about external features, even if the operator is supposed to confirm the entered additional information, the operator can confirm it easily with fewer errors.

According to a fourth aspect of the invention, a system for identifying individuals comprises:

an image output unit for taking pictures of an individual as an object to be identified from different camera angles and inputting images of the object;

an image analyzing means for analyzing the image and extracting the features of the external appearance of the object; and an output unit for obtaining a name by which to identify an individual under identification according to the features.

It may be provided that the image analyzing means extracts the features by selecting a name of a feature corresponding to the image for each of the elements of external appearance out of the names of predetermined features allotted to variations of respective elements of the external appearance.

It may be provided that the fourth aspect of the invention further includes a data base of data representing the features of the external appearance of a plurality of individuals by the names of features, the data being associated with the names of the individuals when the data is accumulated, wherein the output unit is so arranged as to search the database, and obtain the names of individuals having the names of features corresponding to the names of features selected at the image analyzing means as the names of individuals under identification.

It may be provided that the individuals to be identified and the plurality of objects are animals, and that the elements of the external appearance, which are used in the image analyzing means, the database and the output unit, are two or more items of the fur color, the white patterns of the head, the location of whirls, and white marks of the legs.

It may be provided that the image analyzing means extracts not less than two items of the location of a scar of an animal under identification and the condition of spots other than white marks, that the database is associated with the names of the plurality of animals, the location of scars or the condition of spots of each animal when data is accumulated, and that the output unit searches the database using the location of the scar or the condition of spots extracted from the image to thereby obtain the name of the animal to be identified.

According to the fifth aspect of the invention, a system for identifying individuals comprises:
  a name input means for entering the name of an individual under identification;
  an image input unit for inputting images of an individual under identification by taking images of the object;
  an image analyzing means for analyzing the image and extracting the features of the external appearance of an individual under identification;
  a data base for accumulating data representing the features of the external appearance of individuals associated with the names of a plurality of individuals, and searching data corresponding to the names input through the name input means to thereby output the data; and
  a true/false decision unit for making a decision of whether an individual under identification is true or not by comparing the features found at said data base with the features extracted by said image analyzing means.

It may be provided that the image analyzing means extracts the features by selecting a name of a feature corresponding to the image for each of the elements of external appearance out of the names of predetermined features allotted to variations of respective elements of the external appearance.

It may be provided that the data base is accumulated in such a way that items of data on the features of the external appearance of the plurality of individuals are associated with the names of the individuals, the items of data being represented by the names of the features, and that the true/false decision unit makes a decision of whether an individual under identification is true or not by comparing names of the features found at the data base with names of the features extracted by the image analyzing means.

It may be provided that the individuals under identification and the plurality of individuals are animals and that the elements of the external appearance, which are used in the image analyzing means, the database and the output unit, are two or more items of the fur color, the white patterns of the head, the location of whirls, and white marks of the legs.

It may be provided that the image analyzing means extracts not less than two items of the location of a scar and the condition of white marks of an animal under identification, the database associates the names of the plurality of animals with the condition of scars of each animal or the condition of spots when accumulating data, and the true/false decision unit makes a decision of whether the animal under identification is true or not from the location of scars or the condition of spots extracted from the image.

It may be provided that the image input unit is formed by a plurality of cameras, disposed around the object under identification, for taking images of the object under identification.

It may be provided that the image input unit is formed by a camera movable around an individual under identification to take images of the object under identification.

BRIEF DESCRIPTION OF THE DRAWINGS

FIG. 16 is a diagram showing the names of the colors of horses;

FIG. 19 is a diagram showing the white patterns (Part 1) of the horse head;

FIG. 20 is a diagram showing the white patterns (Part 2) of the horse head;

FIG. 21 is a diagram showing the names of the white patterns of the horse head;

FIG. 24 is a diagram showing the names and locations of whirls of horses;

FIG. 27 is a diagram showing names of the white marks of the legs;

DESCRIPTION OF THE PREFERRED EMBODIMENTS

Embodiments of the present invention will be described in detail with reference to the accompanying drawings.

Embodiment 1

Composition

Figures 1, 2:
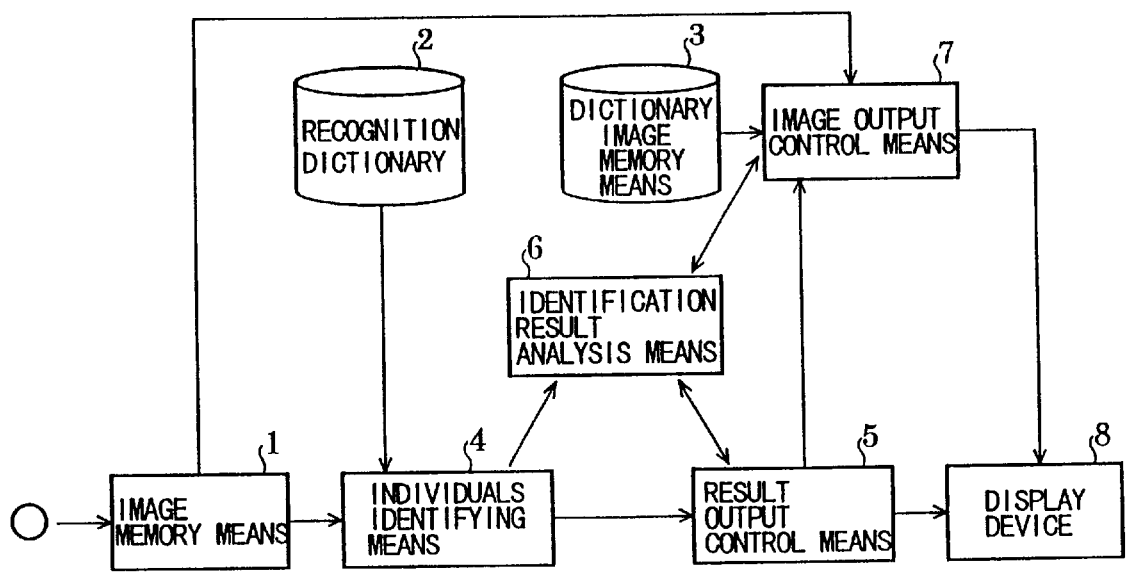
FIG. 1 is a block diagram showing a first embodiment of the individual identification system of the present invention.
FIG. 2 is a diagram for explaining an example of the recognition dictionary in the first embodiment of the present invention.

FIG. 1 is a block diagram showing a first embodiment of the system for identifying individuals according to the present invention.

The system in FIG. 1 is a computer system and comprises image memory means 1, a recognition dictionary 2, dictionary image memory means 3, individuals identifying means 4, result output control means 5, identification result analysis means 6, image output control means 7, and display device 8. In this embodiment, description will be made of identification of an individual by collation of iris images.

The image memory means 1 is installed in an auxiliary memory device, such as a semiconductor memory or a disk, and performs a function to store input images of individuals as objects under identification. The images are acquired through A/D conversion of images taken by the video camera, VTR, etc. The images held in this image memory means 1 are used by the individuals identifying means 4 and the image output control means 7.

The recognition dictionary 2 is installed in the auxiliary memory device, such as a semiconductor memory or a disk, and has data on features of objects under identification stored in advance.

FIG. 2 is an explanatory diagram of the recognition dictionary 2.

As illustrated, the recognition dictionary 2 holds iris codes as data on features and user information (name, sex, etc.).

The dictionary image memory means 3 is mounted in the auxiliary memory device, such as a semiconductor memory or a disk, and holds the images when respective dictionary were created and recorded in the recognition dictionary 2.

Figures 3, 4:
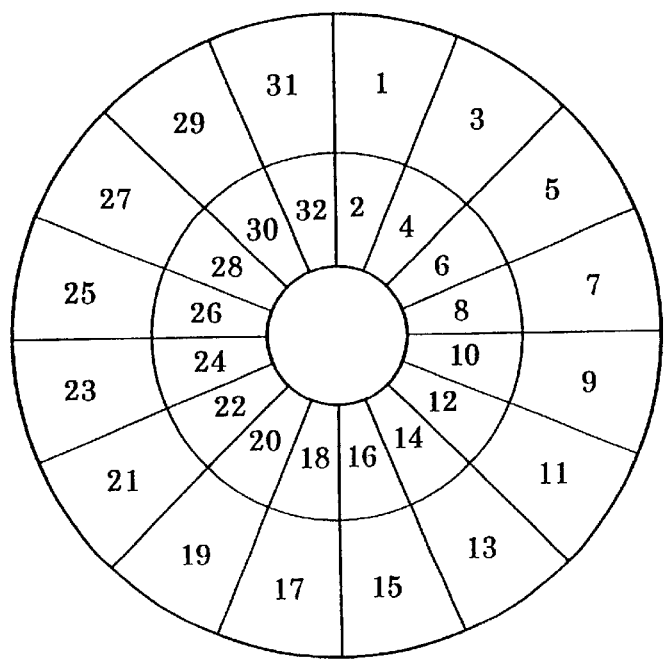
FIG. 3 is a diagram for explaining an example of the dictionary image memory means in the first embodiment of the individual identification system of the present invention.
FIG. 4 is a diagram for explaining an example of division of the iris region in the first embodiment of the individual identification system of the present invention.

FIG. 3 is an explanatory diagram of the dictionary image memory means 3.

As illustrated, the dictionary image memory means 3 holds images entered at the times of creating dictionaries of the recognition dictionary 2, and the respective images correspond to the respective dictionaries stored in the recognition dictionary 2 on a one-to-one correspondence.

The individuals identifying means 4 analyzes an input image held in the image memory means 1, and recognizes the iris by comparing it with feature data of the recognition dictionary 2 to thereby identify the individual. The results of the individuals identifying means 4 are utilized by the result output control means 5.

The result output control means 5 issues an analyze command to the identification result analysis means 6 according to an identification result of the individuals identifying means 4, and when having sent the analyze command, in response to an analysis result from the identification result analysis means 6, makes a decision of whether or not to display the input image held in the image memory means 1, the dictionary image stored in the dictionary image memory means 3 and an analysis result. The result output control means 5 output a decision result to the image output control means 7.

On the basis of an identification result from the individuals identifying means 4, the identification result analysis means 6 detects that area of the input image used for identification which does not agree with the dictionary image.

Also on the basis of a decision result from the result output control means 5, the image output control means 7 controls image display. The display device 8 is formed by a CRT or a liquid display device, or the like, and displays the discordant portion.

Operation

First of all, suppose that the recognition dictionary 2 and the dictionary image memory means 3 each contain the users' iris codes and the images entered at the times of dictionary creation stored previously. The method of generating iris codes in this case is a well-known one, and its description is omitted.

Also suppose that under the above condition, an image was input and held in the image memory means 1. The individuals identifying means 4 analyzes the input image held in the image memory means 1, and compares it with dictionary data 2. This process will be described briefly. From the image of the eye held in the image memory means 1, a circumscribed circle of the pupil and a circumscribed circuit of the iris are obtained. The, polar coordinates are set relative to two circles as the references, the iris region is divided into subdivisions, which are subjected to a filter process and a threshold process, outputted as codes consisting of 0 and 1 (hereafter referred to as iris codes). Identification of an individual is performed by comparing the codes, thus generated, with codes stored in the recognition dictionary 2.

To cite an example, in the literature mentioned in the paragraph on the prior art, Hamming distances between the iris code created from the input image and the iris codes of the recognition dictionary 2 are calculated, and a dictionary which brings about the smallest Hamming distance is selected. (The Hamming distance at this time is called HDMIN.) When the Hamming distance at this time is smaller than a preset threshold value (HDTH), a decision is made that the person has been identified. The minimum value of Hamming distances during identification HDMIN is used in the result output control means 5.

The identification result of the individuals identifying means 4 is outputted to the result output control means 5 and the identification result analysis means 6. The operation of the result output control means 5 will be described. The result output control means 5 makes a decision whether or not to analyze the identification result on the basis of the identification result of the individuals identifying means 4. For example, in this decision making, the result output control means 5 uses the same threshold value that is used by the individuals identifying means 4 for identification of a person. If the Hamming distance HDMIN outputted by the individuals identifying means 4 is larger than the threshold value HDTH, the result output control means 5 issues a command to the identification result analysis means 6 directing it to analyze the identification result. Analysis by the identification result analysis means 6 will be described later.

When the identification result analysis means 6 finishes the analysis of the identification result, the result output control means 5 decides a result output mode according to the analysis result. For example, if the identification result analysis means 6 makes a decision that the iris codes differ for the most part, the result output control means 5 issues a command to the image memory means 1 directing it to display only the input image stored therein without displaying the dictionary image.

Because the input image is displayed, the user can get information about whether or not the failure of identification is due to poor picture quality (blur, out of focus, etc.) or due to his closing the eyes, and so on. In this case, since the dictionary image is not displayed, security can be maintained even if a completely different person in bad faith should use the system.

Even when the identification result analysis means 6 decides that the iris codes differ partially, since there is a possibility that the user is registered in the recognition dictionary 2, if the area where the iris codes differ is displayed, this will be helpful for conjecturing the cause of failure to recognize a correct user. If an operator attends the system, when the system failed to recognize a correct user, the operator can make a final decision according to a displayed image. Therefore, the result output control means 5 directs the image output control means 7 to output the 'input image', the 'dictionary image', and the 'area where the iris codes disagree' to the display device 8.

The operation of the identification result analysis means 6 will be described in detail.

The identification result analysis means 6 detects the area in the input image used for identification which does not agree with the dictionary image on the basis of the identification result of the individuals identifying means 4. Since identification of an individual by iris codes is performed in this embodiment, a decision is made whether or not codes differ in the whole region or whether or not some areas agree even though there are discordant portions. The identification result analysis means 6 also detects the locations of the coincident areas and the discordant portions.

If it is found by making those decisions that the iris codes do not agree on the whole, there is a possibility that the person under identification is totally different from the person registered in the dictionary or the input image has a poor picture quality. On the other hand, if the iris codes disagree in a limited area, a possibility is that a part of the iris is hidden behind the eyelid or eyelashes. In other words, though the person is a correct person, a wrong decision was made. In such a case, both the input image and the dictionary image can be displayed to clarify the locations of coincident areas and discordant portions, by which the user can surmise the cause of erroneous recognition. Again, if an operator attends the system, he can make a final decision.

Description will now be made of the method of making a decision of whether the iris codes differ for the most part or partially according to a result of iris recognition.

FIG. 4 is an explanatory diagram of a case where the iris region is 32 subdivisions.

The number of subdivisions may be decided according to the purpose of use, etc.

The identification result analysis means 6 calculates for the respective subdivisions Hamming distances generated from the Iris codes of a dictionary selected finally by the individuals identifying means 4 and also from the input image.

Figures 5, 6:
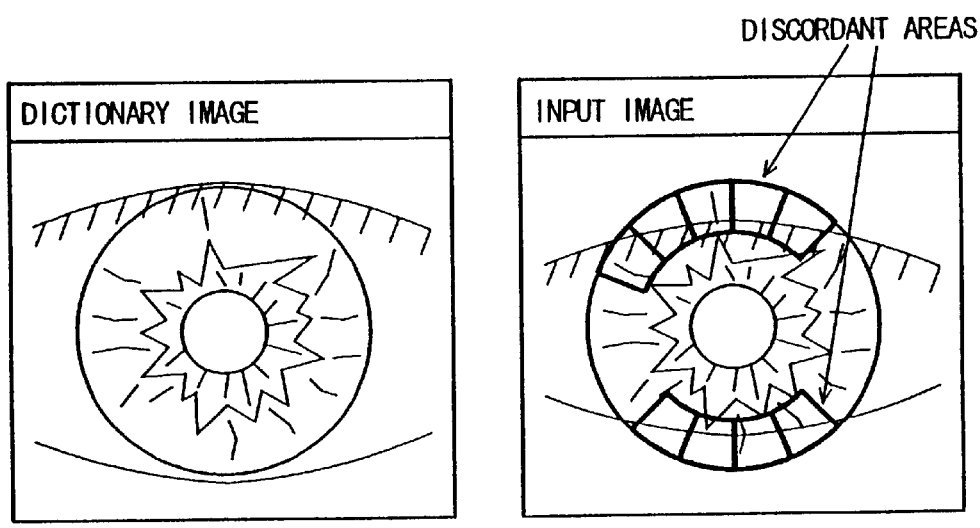
FIG. 5 is a diagram for explaining an example of calculation results of Hamming distances of different regions in the first embodiment of the individual identification system of the present invention.
FIG. 6 is a diagram for explaining an example of the result of image display in the first embodiment of the individual identification system of the present invention.

FIG. 5 shows an example of a calculation result of Hamming distances of the respective subdivisions.

Then, a number N1 representing those Hamming distances larger than a predetermined threshold value TH1 is calculated. When N1 is larger than a predetermined threshold value TH2, a decision is made that the iris codes differ on the whole. In contrast, when N1 is smaller than N2, a decision is made that the iris codes differ partially. When a decision of partial difference is made, the sub-region numbers at which Hamming distances are larger than TH1 are outputted to the image output control means 7.

The operation of the image output control means 7 will next be described.

The image output control means 7 displays images in response to a command from the result output control means 5. More specifically, the image output control means 7 controls the display of input images held in the image memory means 1 and images that are stored in the dictionary image memory means 3 and that correspond to a dictionary selected finally by the individuals identifying means 4. Furthermore, the image output control means 7 displays a detection result of discordant sub-divisions outputted from the identification result analysis means 6.

FIG. 6 shows an example of an image display result.

The illustrated example is a case in which the sub-region numbers 1, 3, 13, 15, 17, 19, 27, 29 and 31 are judged to be discordant subdivisions when the iris region was divided as shown in FIG. 4 and analyzed.

As is clear from this case, when comparing dictionary images with the input image, the user or the operator needs to compare only those subdivisions where discordance occurred, so that the reason for failure of recognition can be surmised easily. In this example, the subdivisions where discordance occurred are obviously those that are hidden by the eyelid. Because the images agree in other subdivisions, even if the system could not judge the person to be a correct person, the operator can identify him as a correct person. In the case of FIG. 6, the discordant sub-divisions are indicated by enclosing with a solid line, but the mode of display is not limited to this method. Any mode of display may be used so long as the discordant sub-divisions can be notified to the user.

Some of possible methods are as follows.

The discordant subdivisions lying successively are enclosed by a single line as a single region.

An image showing only the discordant subdivisions is displayed.

The discordant subdivisions are highlighted (smoothening of brightness value, for example).

To show an illustrative example of individual identification, a case, which uses the iris, has been described. However, this embodiment may be applied to individual identification processes for human beings or animals, which uses analysis of images.

A modified embodiment of the present invention will be described in the following.

In a certain type of application (an operator attends the system at all times, for example), the input image and the dictionary image are always displayed. (in this case, the result output control means can be obviated.)

When the analysis results of the identification result analysis means 6 differ for the most part, neither the dictionary image nor the input image is displayed. This is used in a case where emphasis is placed on the preservation of security against a totally different person in bad faith tries to use the system.

A dictionary image is not displayed. (Therefore, the dictionary image memory means 3 is obviated.)

The result output control means 5 has heretofore used one threshold value in making a decision of whether or not to display images, but here uses a plurality of threshold values.

When a decision is made using two threshold values, for example,

HDMIN<HDTH1→No image displayed
HDTH1≦HDMIN<HDTH2→No image displayed
HDTH2≦HDMIN→No image displayed For analysis by the identification result analysis means 6, images held in the image memory means 1 and images stored in the dictionary image memory means 3 are used. For example, in the first embodiment, feature data, such as iris codes, is compared. However, in comparison between an input image and a dictionary image, the pixels of multiple gray levels may be compared.

Effects

As has been described, according to the first embodiment, even when a correct person could not be identified in individual identification, the input image, the dictionary image and the discordant portions are displayed to the user, and therefore the user can easily surmise the cause of faulty recognition. When there is an operator attending the system, even if the system failed to identify a correct person, the operator can survey a displayed image, and thereby make a final decision easily. Thus, it is possible to realize an individual identification system for the user or the operator to operate very easily.

An input image and a dictionary image are displayed selectively after the identification result is analyzed, so that security can be maintained. In addition, images are not always displayed, and therefore hopes are held for effects of suppressing the amount of processing.

All operations of the first embodiment can be performed under control of a computer program, which performs the function of the individual identification system. Therefore, the individual identification system according to the present invention can be realized, for example, by a method by recording the program on a recording medium, such as a floppy disc or a CD-ROM, and installing the program in a computer, or downloading the program from a network, or by another method, or by another method of installing the program in a hard dick or the like.

Embodiment 2

According to a second embodiment of the present invention, additional information is used which includes features peculiar to objects under identification, such as the color of the eye, the length and the color of fur. Additional information is stored in a dictionary used for individual identification, along with the quantities of features used for identification (iris codes, for example). When identification failed, additional information is input sequentially, and the identification process is performed again using only dictionaries having conditions confirming with the conditions of inputted additional information. In the re-identification, the threshold values for a decision are varied in a sequential order.

Arrangement

Figures 7, 8:
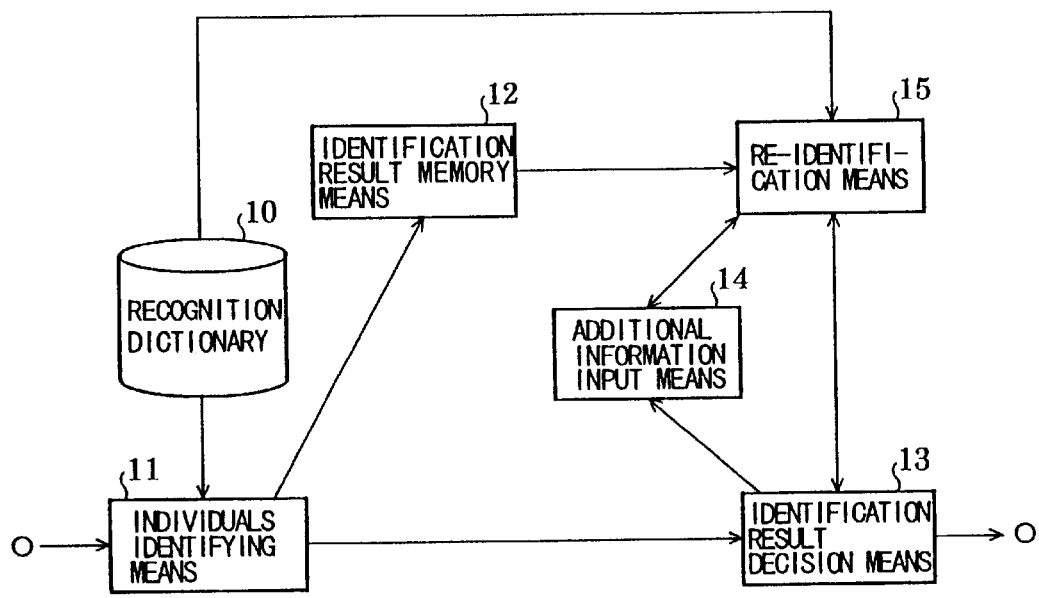
FIG. 7 is a block diagram of a second embodiment of the individual identification system of the present invention.
FIG. 8 is a diagram for explaining the contents of the recognition dictionary in the second embodiment of the individual identification system of the present invention.

FIG. 7 is a block diagram showing a second embodiment of the individual identification system according to the present invention. The system shown in FIG. 1 comprises a recognition dictionary 10, individuals identifying means 11, identification result memory means 12, identification result decision means 13, additional information input means 14, and re-identification means 15. Regarding this second embodiment, description will be made of a case in which the recognition of the iris of an animal under identification is performed.

The recognition dictionary 10 is mounted in the auxiliary memory device, such as a semiconductor memory or a disc, and holds iris codes as feature sizes used for identification in the individuals identifying means 11, and additional information about external features peculiar to the object under identification.

FIG. 8 is a diagram for explaining the contents of the recognition dictionary 10.

As illustrated, the recognition dictionary 10 holds iris codes and additional information about the distinction of sex, the color of the fur and the eye, and the tail.

The individuals identifying means 11 extracts feature data from the image of an individual under identification input from image input means, not shown, and compares the feature data with iris codes from the recognition dictionary 10 to thereby identify the individual, and outputs a result to the identification result memory means 12 and the identification result decision means 13.

The identification result memory means 12 holds a result of comparison with dictionaries in the recognition dictionary 10 by the individuals identifying means 11. In the case of this embodiment, Hamming distances are obtained as results, so that Hamming distances of the respective dictionaries are stored in the result memory means 12.

The identification result decision means 13 decides whether or not to perform re-identification according to an identification result of the individuals identifying means 11, and when having made decision not to input additional information, outputs the identification result of the individuals identifying means 11 as the final result, and when the decision was not to input additional information, issues a command to the additional information input means 14 directing it to acquire additional information, and issues another command to the re-identification means 15 directing it to perform a re-identification process. Furthermore, the identification result decision means 13 outputs a decision to terminate the re-identification process according to the inputted re-identification result and also outputs a final identification result.

The additional information input means 14 urges the user or the operator to input additional information, and if additional information is supplied, outputs the additional information to the re-identification means 15. The additional information input means 14 is formed by a display device, such as a monitor, and input devices, such as a touch panel, a keyboard and a mouse.

The re-identification means 15 starts to run in response to a re-identification command from the identification result decision means 13. On receiving each item of additional information from the additional information input means 14, the re-identification means 15 selects that dictionary (ID-No. ) of the recognition dictionary 10 which covers all additional information input heretofore, and reads the selected dictionary and a Hamming distance as an identification result from the identification result memory means 12, and selects a dictionary at the minimum Hamming distance, and outputs this value to the identification result decision means 13.

Operation

When image data of an individual under identification is input to this system, the individuals identifying means 11 analyzes the image data to thereby obtain feature sizes, and compares the feature sizes with the feature sizes registered in the recognition dictionary 10, and thus identifies the individual.

In the identification process, a circumscribed circle of the pupil and a circumscribed circle of the iris are obtained from the image of the eye of the object under identification, the image being taken by the a video camera. Then, polar coordinates are set with respect to two circles as references, the iris region is divided into multiple subdivisions, which receive a filter process and a threshold value process, and are outputted as codes of 0 and 1 (hereafter referred to as iris codes). The iris codes thus generated and the iris codes stored in the recognition dictionary 10 are compared to identify the individual.

For example, in the literature mentioned when the prior art was referred to, a Hamming distance is calculated between the iris codes generated from the input image and the iris codes of the recognition dictionary 10, and a dictionary which brings about the minimum Hamming distance is selected. (The Hamming distance at this time is designated as HDMIN.) When the Hamming distance at this time is lower than a predetermined threshold value (HDTH), the individual is judged to be a correct one. The minimum value HDMIN of Hamming distance during identification is used in the identification result decision means 13. The Hamming distance obtained by comparison with dictionaries of the recognition dictionary 10 is stored in the identification result memory means 12.

Figures 9, 10:
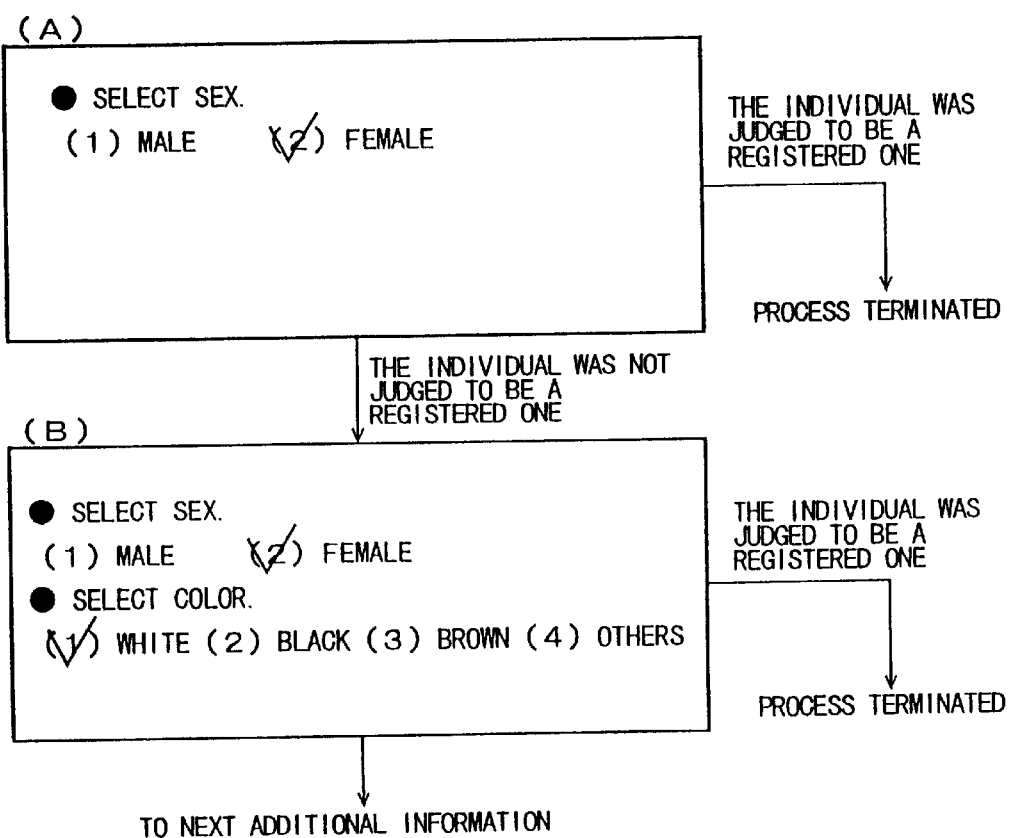
FIG. 9 is a diagram for explaining the contents of the identification result memory means in the second embodiment of the individual identification of the present invention.
FIG. 10 is a diagram for explaining the re-identification in the second embodiment of the present invention.

FIG. 9 is a diagram for explaining the contents of the identification result memory means 12.

As shown in FIG. 9, a Hamming distance for each dictionary (ID-No.) of the recognition dictionary 10 is stored. Information stored in the identification result memory means 12 is used in the re-identification means 15.

Description will then be made of a decision about identification results and the re-identification process.

The identification result decision means 13 decides whether or not to input additional information on the basis of identification result of the individuals identifying means 11. When the minimum value HDMIN of Hamming distance outputted by the individual identification means 11 is smaller than a predetermined threshold value HDTH, the decision means 13 decides not to input additional information. If a decision is made not to input additional information, the identification result outputted by the individual identification means 11 is outputted as the final result.

In contrast, when the minimum value HDMIN of Hamming distance is higher than the predetermined threshold value HDTH, the identification result decision means 13 uses the additional information input means 14 to prompt the operator to supply additional information, and directs the re-identification means 15 to perform the re-identification process.

FIG. 10 is a diagram for explaining the re-identification process.

Each time additional information is input to the additional information input means 14, the re-identification means 15 selects a dictionary (ID-No.) matching this additional information, and reads Hamming distances between the selected dictionary and the identification result from the identification result memory means 12, obtains the minimum value HDMIN1 of Hamming distances, and outputs this value to the identification result decision means 13.

The identification result decision means 13 decides whether or not the obtained Hamming distance is smaller than the predetermined threshold value HDTH1 (HDTH1>HDTH), and if it is smaller than the threshold value, outputs a dictionary, which brings about the minimum value HDMIN1, as the final result, and decides that the individual has been identified as the one registered in the dictionary 10. For example, in the example in FIG. 10, "Sex" was input as the first additional information, and the operator selected "Female." If the individual is judged to be a registered individual, the identify process is finished.

On the other hand, also in the re-identification process in the re-identification means 15, which includes the first additional information, if the obtained HDMIN1 is larger than HDTH1, the identification result decision means 13 directs the additional information input means 14 to input the next additional information, and also directs the re-identification means to perform the re-identification process. When additional information is input, as with the first information, the re-identification means 15 obtains an identification result HDMIN2 covering the initially-input additional information and additional information this time, and outputs HDMIN2 to the identification result decision means 13. For example, in the example of FIG. 10, (A) shows a case where the individual was not identified as the registered one. Suppose that the additional information input means 14 prompts the operator to input "the color of the fur" as shown in (B), and the operator selects "White."

The identification result decision means 13 decides whether or not the HDMIN2 obtained by the re-identification process is smaller than the threshold value HDTH2 (HDTH2>HDTH1), if HDMIN2 is found smaller, outputs a dictionary, which brings about the minimum value HDMIN2, as the final result, and decides that the individual has been identified as the one registered in the dictionary. On the other hand, if HDMIN2 is larger than HDTH2, the decision means 13 directs the additional information input means 14 to input the next additional information, and also directs the re-identification means 15 to perform a re-identification process, so that the above-mentioned operation is repeated.

As has been described, a more suitable dictionary is selected each time the operator inputs additional information, and a comparison is made between the minimum value of Hamming distance obtained with the selected more suitable dictionary and a threshold value larger than the previous set value, by which the individual is judged correct or false. Therefore, when the conditions are satisfied before the operator inputs all of additional information, the individual identification process is finished. When the above-mentioned minimum value is not smaller than the preset threshold value after all additional information has been input, the individual is judged to be not any of the individuals registered (not included in the recognition dictionary 10).

In the foregoing second embodiment, the individual under identification is an animal, the operator inputs additional information. When the individual is a human being, however, it is possible for the person to input additional information by himself. In this case, preferably, the operator manages the system to make sure that the input additional information is correct.

Effects

According to the second embodiment, even if the decision about an individual's identity failed, the user or the operator is urged to input additional information, a dictionary is selected by using the input additional information, and an identity decision is made after the threshold value for the decision is changed (relaxed little by little). Even when the system failed in the identity decision, it is still possible to make an identity decision on the individual.

Each time an item of additional information is input, a decision is made by executing a re-identification process. Therefore, even before all additional information is input, it is possible to make a decision on an individual's identity. Accordingly, redundant input operations need not be performed, with the result that time spent for a decision can be reduced.

Furthermore, because the identification result of the individuals identifying means 11 is stored in the identification result memory means 12, the individuals identifying means 11 need not execute the same operation during re-identification. Therefore, the amount of processing can be reduced to a minimum, which contributes to the improvement of the processing speed. As a result, a high-performance system for individual identification can be realized.

All operations in the second embodiment can be carried out by control of a computer program to perform the function of the individual identification system.

Accordingly, the individual identification system according to the present invention can be materialized by a method by recording the program on a recording medium like a floppy disc and a CD-ROM, installing the program in a computer, or downloading the program from a network, or by another method of installing in a hard disc.

Embodiment 3

Figure 11:
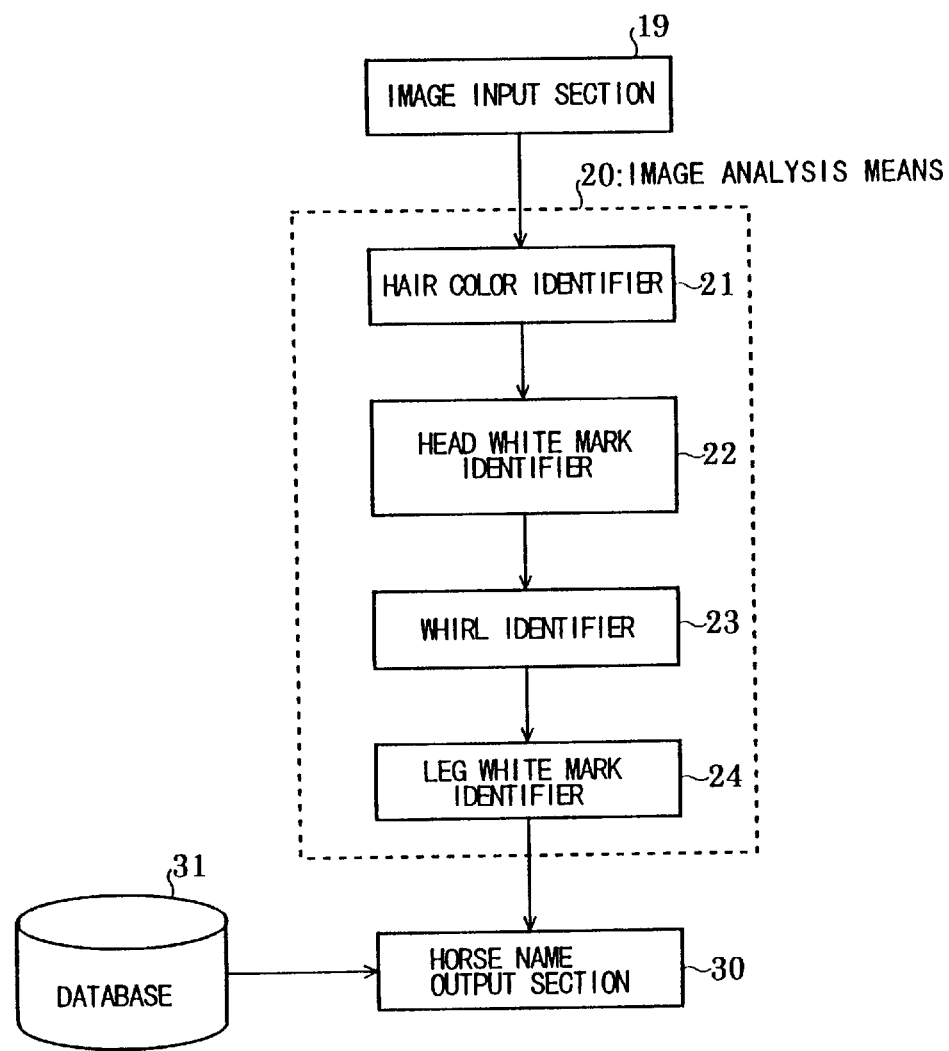
FIG. 11 is a block diagram of the individual identification system according to a third embodiment of the present invention.

FIG. 11 is a block diagram of the individual identification system according to a third embodiment of the present invention.

This individual identification system is a system for identifying an individual racing horse, for example, and comprises an image input unit 19, image analysis means 20 for analyzing an input image and extracting the features of the horse under identification, a horse name output unit 30 connected to the image analysis means 20, and a database 31 for providing the features of each individual to the horse name analysis unit 30.

The image input unit 19 accepts an image of a horse under identification, and is formed of one or more cameras. The image analysis means 20 is formed of a CPU and a memory, and includes a hair color identifier 21 which identifies a hair color of a horse from an image input from the image input unit 19. The hair color identifier 21 is connected on its output side to a head white mark identifier 22. The head white mark identifier 22 is connected on its output side to a whirl identifier 23. The whirl identifier 23 is connected on its output side to a leg white mark identifier 24. A horse name output unit 30 is connected to the output side of the leg white mark identifier 24 of the image analysis means 20. The horse name output unit 30 outputs an identification result of the horse under identification.

The operation of the individual identification system will be described with reference to FIGS. 12 to 28.

Figure 12A:
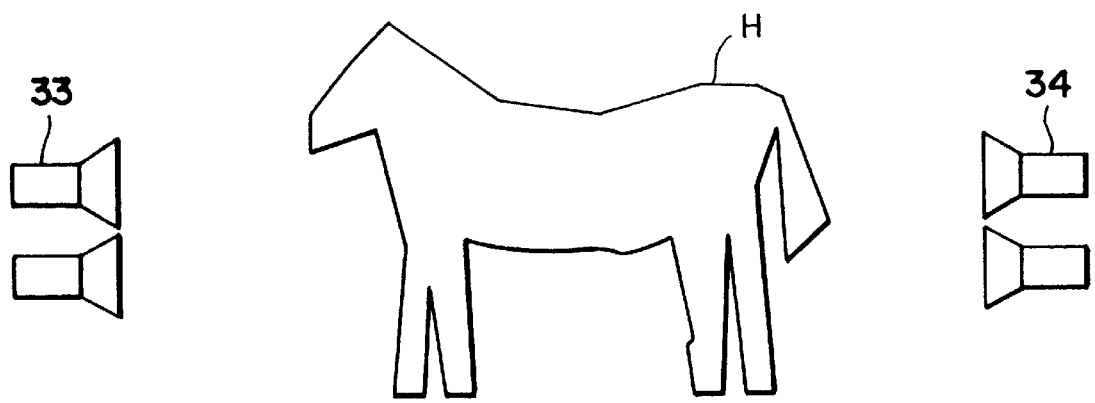
FIG. 12 is a diagram showing camera positions of the image input portion in FIG. 11.
Figure 12B:
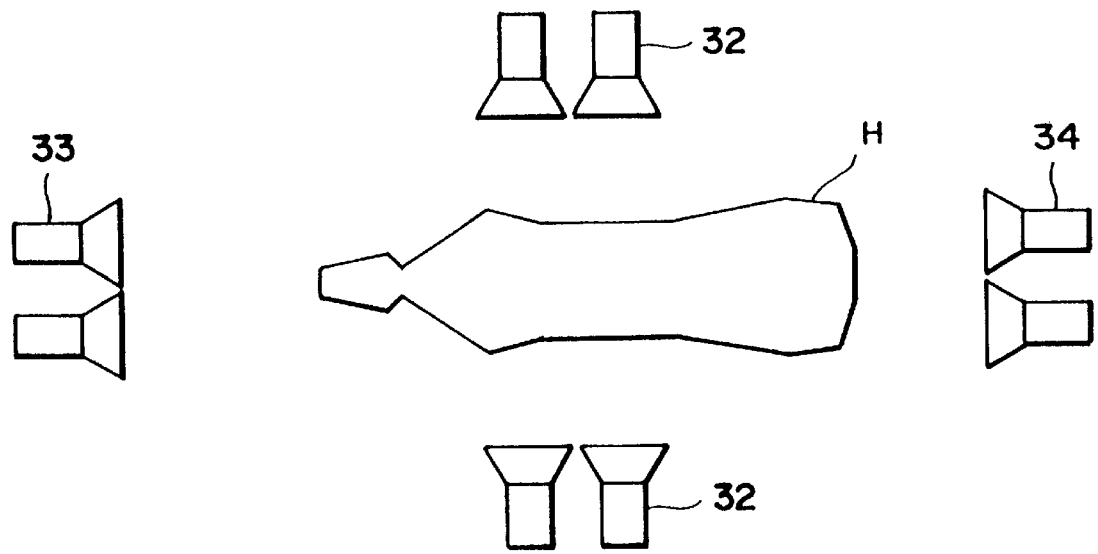
Figure 13A:
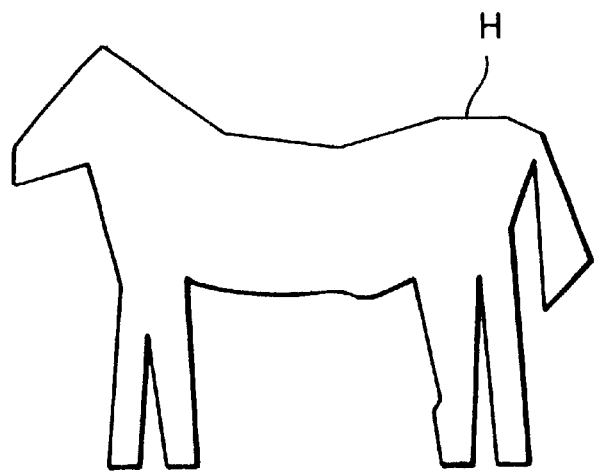
FIG. 13 is a diagram showing a horse photographed by cameras 32 to 34 in FIG. 12.
Figure 13B:
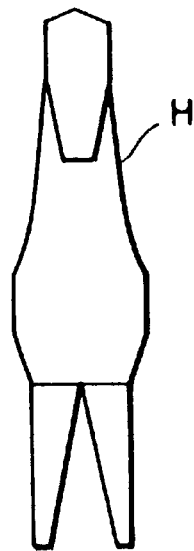

FIGS. 12(a) and 12(b) show the locations of the cameras of the image input unit 19 in FIG. 11. FIG. 12(a) is a side view and FIG. 12(b) is a top view. FIGS. 13(a) and 13(b) are views of the horse photographed by the cameras 32 and 34 in FIG. 12.

Figure 13C:
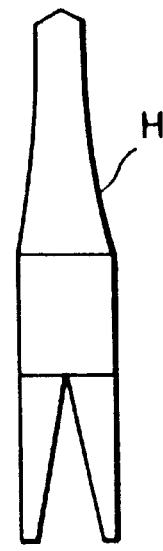

The cameras 32 to 34 of the image input unit 19 are arranged around the horse H as shown in FIGS. 12(a) and 12(b). Various focal distances and apertures, which are the parameters of the cameras 32 to 34 are provided to suit the distance to the horse H as the subject and the magnification. The side cameras 32 located laterally of the horse H take pictures of the body and side view of the legs of the horse H as shown in FIG. 13 (a). The front cameras 33 arranged in front of the horse H take pictures of the face, the chest and the front view of the legs. The rear cameras 33 located at the rear of the horse H take pictures of the buttock and the rear view of the legs of the horse H. FIGS. 12(a) and 12(b) show a case of using a plurality of cameras 32 to 34, but the images corresponding to FIGS. 13(a) and 13(b) may be taken by moving one camera. The image input unit 19 outputs the images of the horse under identification to the image analysis unit 20.

Figure 14:
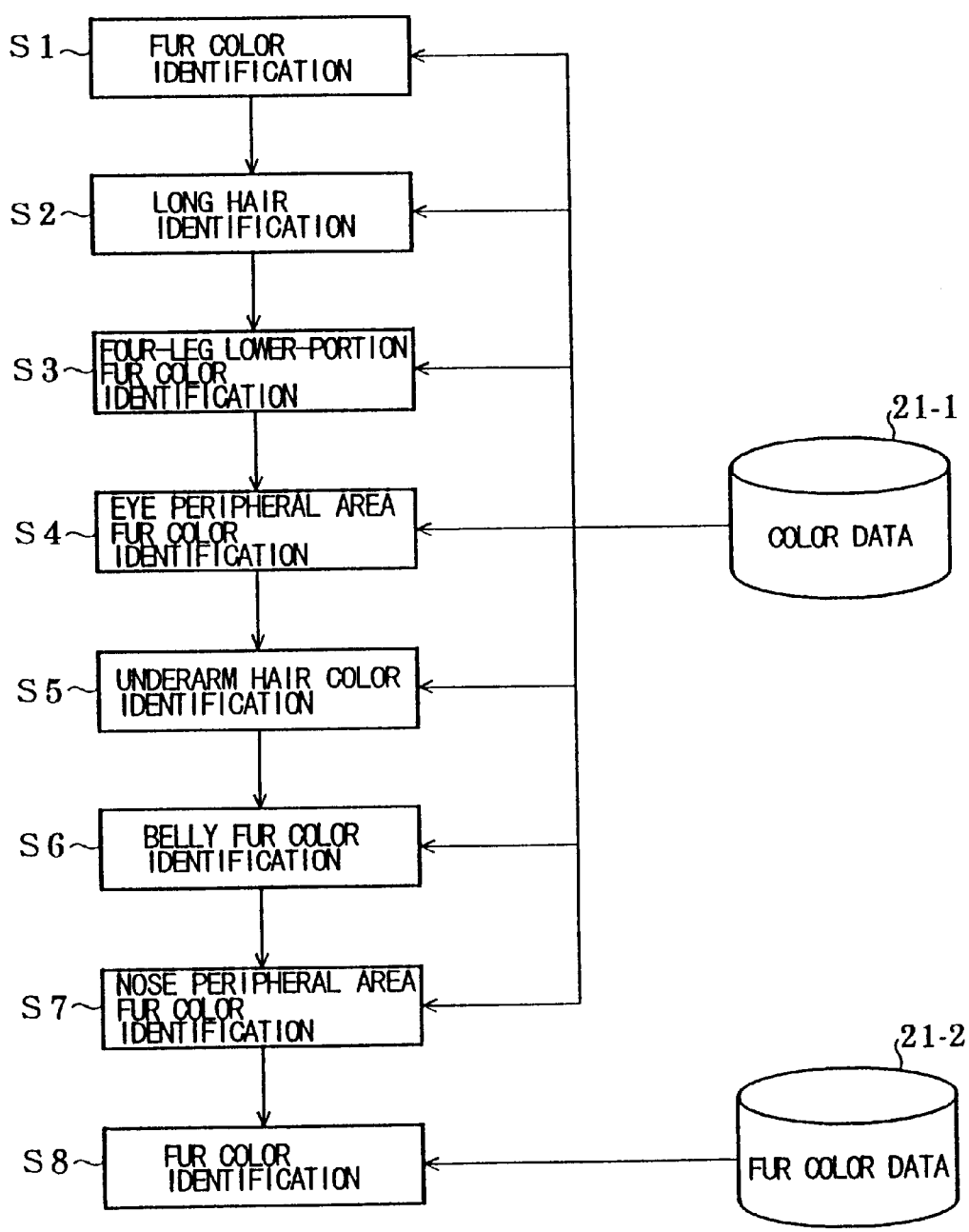
FIG. 14 is a flowchart showing processes of color identification unit 21 in FIG. 11.
Figure 15:
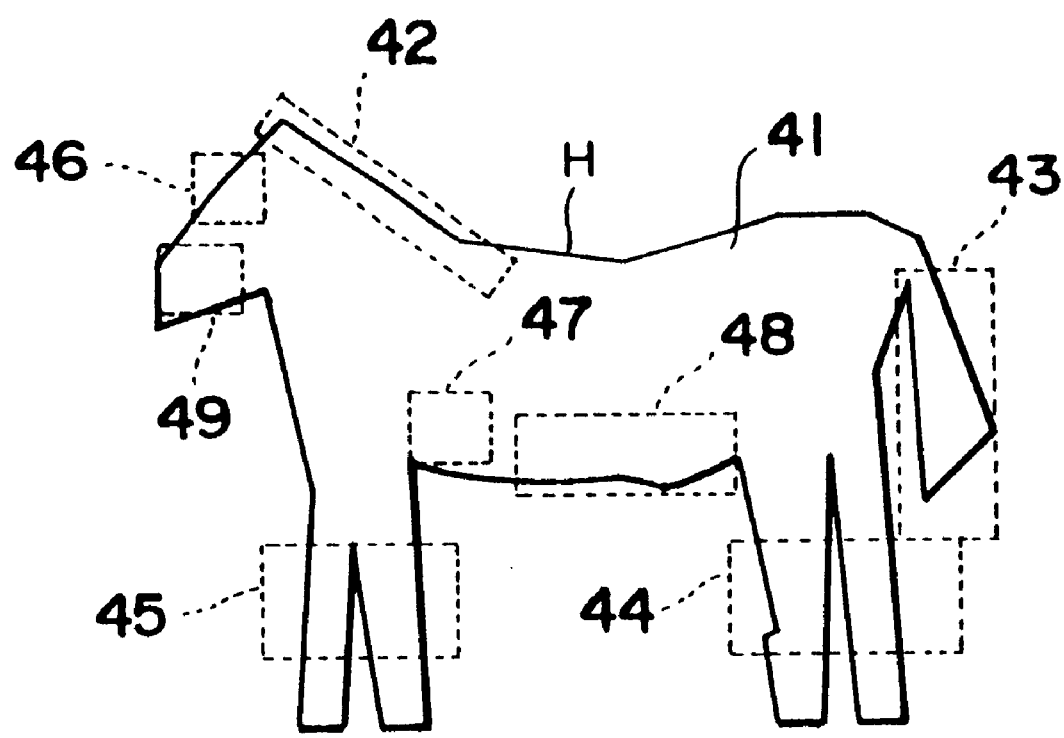
FIG. 15 is a diagram showing the locations where the color is evaluated.

FIG. 14 is a flowchart showing the processes of the hair color identifier 21. FIG. 15 is a diagram showing the locations where hair colors are evaluated. FIG. 16 is a diagram showing the colors of the horse.

The hair color identifier 21 refers to color data 21-1 and hair color data 21-2 stored in memory, not shown, analyzes the images from the image input unit 19 by the processes S1 to S8 in FIG. 14, extracts color names defined according to variations of the hair colors as the external appearance data of the horse, and outputs as a result of hair color identification.

The specific color names of horses are kurige (chestnut), tochi-kurige (tochi-chestnut), kage (dark brown), kuro-kage (blackish dark brown), aokage (bluish dark brown), aoge (bluish dark brown), and ashige (white mixed with black or brown) as shown in FIG. 16. The fur color identification process Si extracts color information of the belly region 41 of FIG. 15 from the supplied image, and compares it with color data 21-1. In this comparison, a color closest to the region 41 is determined, and is extracted as an identification result of the fur color. Horse fur color data, such as yellowing brown, reddish brown, black, white, brown, etc. is stored as color data 21-1. For the color representation method of color data 21-1, it is possible to use the RGB calorimetric system using red (R), green (G) and blue (B) components of the pixels or the CIE-XYZ colorimetric system.

In the long hair color identification process S2 after the fur color identification process S1, color information of the mane region 42 and tail region 43 is extracted from the input image, and like in the fur color identification process S1, the color of long hair (mane and tail) of the horse H is extracted as an identification result. In the four-leg lower portion fur color identification process S3, color information of the leg regions 44, 45 in FIG. 15 is extracted from the input image, and like in the fur color identification process SI, the fur color of the legs of the horse H is extracted as an identification result. In the eye peripheral region fur color identification process S4, color information of the fur of the surrounding region of the eye in FIG. 15 is extracted from the input image, and like in the fur color identification process S1, the fur color in the surrounding region of the eye of the horse H is extracted as an identification result. In the underarm hair identification process S5, color information of the underarm region 47 in FIG. 15 is extracted from the input image, and like in the fur color identification process S1, the hair color of the underarm of the horse H is extracted as an identification result. In the belly fur color identification process S6, color information of the belly region 48 in FIG. 15 is extracted from the input image, and like in the fur color identification process S1, the fur color of the belly of the horse H is extracted as an identification result. In the nose peripheral region fur color identification process S7, color information of the peripheral region 49 of the nose in FIG. 15 is extracted from the input image, and like in the fur color identification process S1, the fur color of the peripheral region of the nose of the horse H is extracted as an identification result.

In the hair color decision process S8, the identified colors in the processes S1 to S8 are compared with a combination of colors stored in hair color data 21-2 and the color of the horse H under identification is decided. By this decision, the color of the fur of the horse H is decided as "kurige" (chestnut), "tochi-kurige" (tochi-chectnut), "kage" (brown), "kuro-kage" (darker reddish brown), "aokage" (dark-bluish black), "aoge" (bluish black) or "ashige" (white mixed with black or brown).

Figure 17:
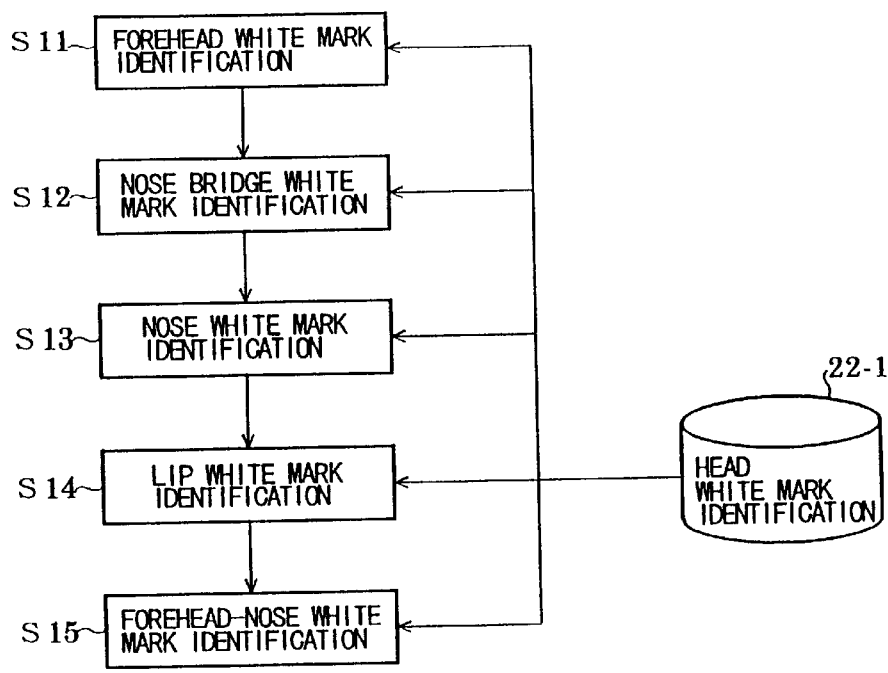
FIG. 17 is a flowchart showing processes of the head white marks identification unit 22 in FIG. 11.
Figure 18:
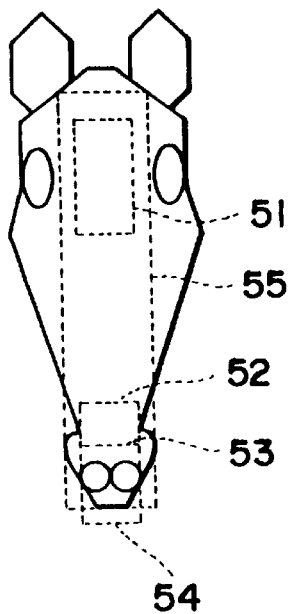
FIG. 18 is a diagram showing the data extraction regions in FIG. 17.

FIG. 17 is a flowchart showing the processes of the head white mark identifier 22, and FIG. 18 is a diagram showing the extraction regions of FIG. 17. FIG. 19 is a diagram showing the white patterns (Part 1) of the horse's head, and FIG. 20 is a diagram showing the white patterns (Part 2) of the horse's head. FIG. 21 is a diagram showing the names of the white marks of the head. The processes of the head white mark identifier 22 will be described with reference to FIGS. 17 to 21.

The head white mark identifier 22 refer to data on head white marks 22-1 stored in memory, shown, extracts the white regions from the image taken by the front camera 33 out of the images from the image input unit 19, analyzes the image in the processes S11 to S15 of FIG. 17, obtains the names defined according to variations of the white patterns of the head as the external appearance data of the head, and outputs as an identification result of the head white pattern. The names of white patterns shown in FIG. 21 are stored in the head white mark data 22-1 along with the locations and sizes of the white marks.

The forehead white mark identification process S11 extracts the white region 51 in the forehead in FIG. 18 from the input image, and selects the name of the pattern by referring to the head white mark data 22-1 and the shape, the size, and the presence or absence of a pattern omission at the center portion. The patterns are divided into "star", "large star", "curved start", "shooting star" or the like according to the white pattern of the forehead of the horse H under identification. When the pattern has a round shape, its size is large, the number is one, and no omission of the central portion is found in measurement, the "large star" shown in FIG. 19 is selected as its pattern name, or if the pattern is small, the "star" or "small star" is selected. If the pattern is not round and has a tailpiece, the "large shooting star" in FIG. 19 is selected. Or, if the white pattern is curved, the pattern is classified as a "curved star." If the central portion is missing, the pattern is called a "ring star."

In the nose bridge white mark identification process S12, the white region 52 on the bridge in FIG. 18 is extracted from the input image, the width of the white region is measured, and a pattern name in FIG. 20 is selected by referring to head white mark data 22-1. In the nose white mark identification process S13, the white region of the nose 53 in FIG. 18 is extracted from the input image, the size of the white region is measured, and a pattern name in FIG. 20 is selected by referring to head white pattern data 22-1. In the lip white mark identification process S14, the white region of the lip 54 in FIG. 18 is selected from the input image, the width of the pattern is measured, and a pattern name is selected from FIG. 20 by referring to head white mark data 22-1. In the forehead-nose white mark identification process S15, the white region of the forehead-nose region in FIG. 18 is extracted from the input image, its size and width are measured, and a pattern name is selected from FIG. 20 by referring to head white mark data 22-1.

Figure 22:
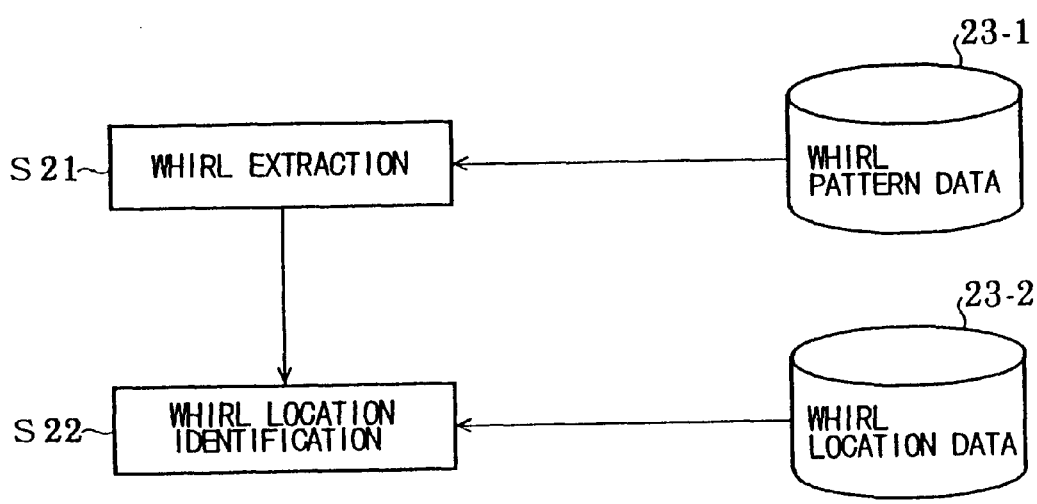
FIG. 22 is a flowchart showing the processes of the whirls identification unit 23 in FIG. 11.
Figures 23A, 23B, 23C:
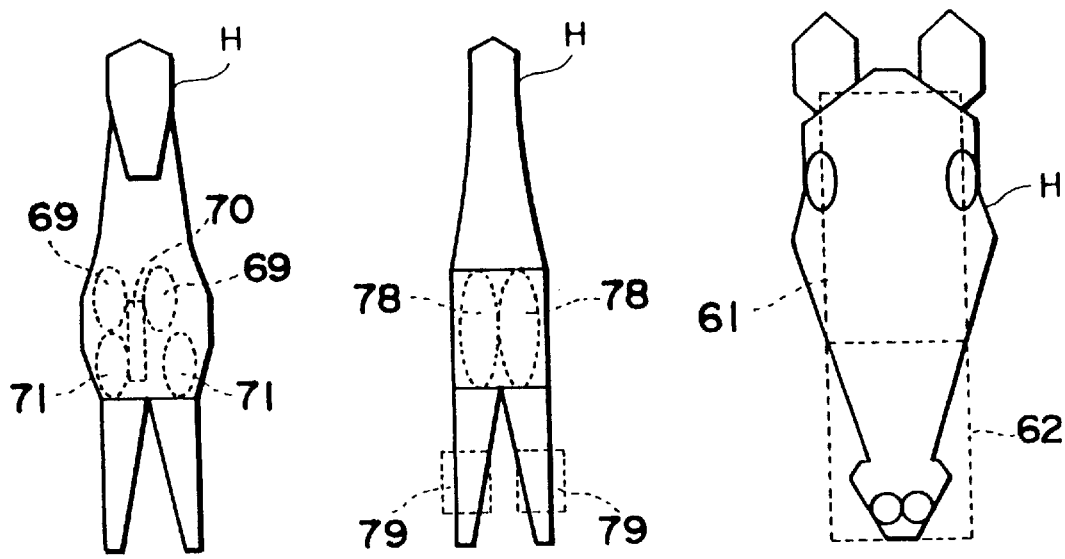
FIG. 23 is a diagram showing the locations where whirls are detected.
Figure 23D:
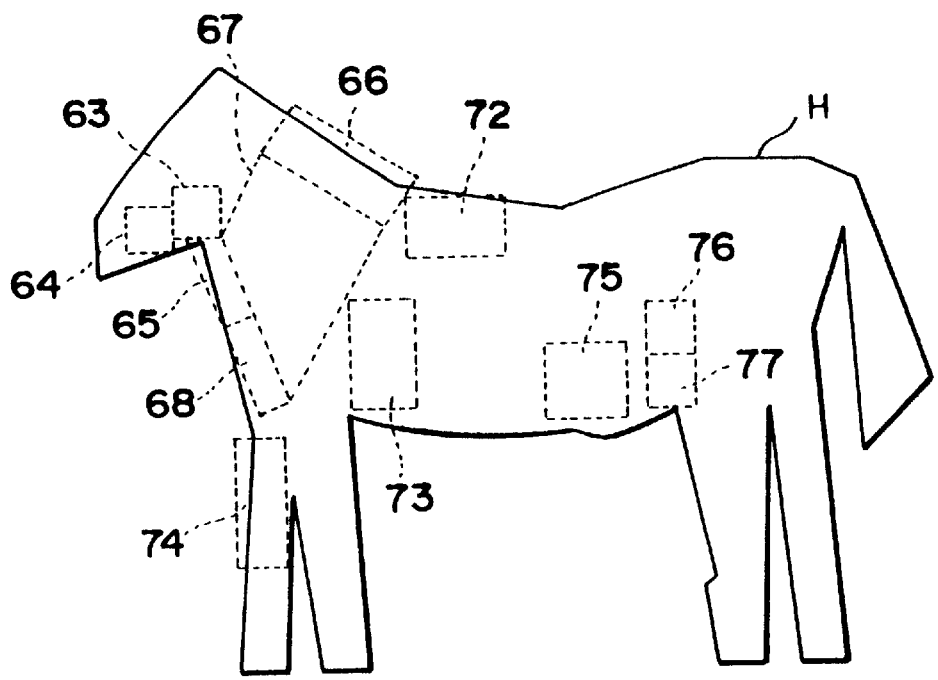

FIG. 22 is a flowchart showing the processes of the whirl identifier 23 in FIG. 11. FIGS. 23(a) to 23(d) are diagrams showing the locations for detecting whirl patterns. FIG. 24 is a diagram showing the locations and the names of whirls of the horse.

The whirl identifier 23 refers to data on whirl pattern 23-1 and whirl location data 23-2 stored in memory, not shown, carries out the processes S21 and S22 in FIG. 22, and obtains whirl data of each horse from the images taken by the cameras 11 to 13 of the image input unit 10.

Whirl pattern data for each fur color is stored in whirl pattern data 23-1, and the names and locations of whirls in FIG. 24 are stored in whirl location data 23-2. The numbers of the whirl locations in FIG. 24 correspond to the numbers allocated to the portions of a horse in FIG. 23.

In the whirl extraction process S21 in FIG. 22, a whirl pattern for the fur color obtained by the fur color identifier 21 is selected from the whirl pattern data 23-1, and locations 61 to 79 where there are whirl patterns from the input image. In the whirl location identification process S22, whirl names are obtained from whirl location data 23-2 according to the whirl locations 61 to 79 obtained in the whirl extraction process S21.

Figure 25:
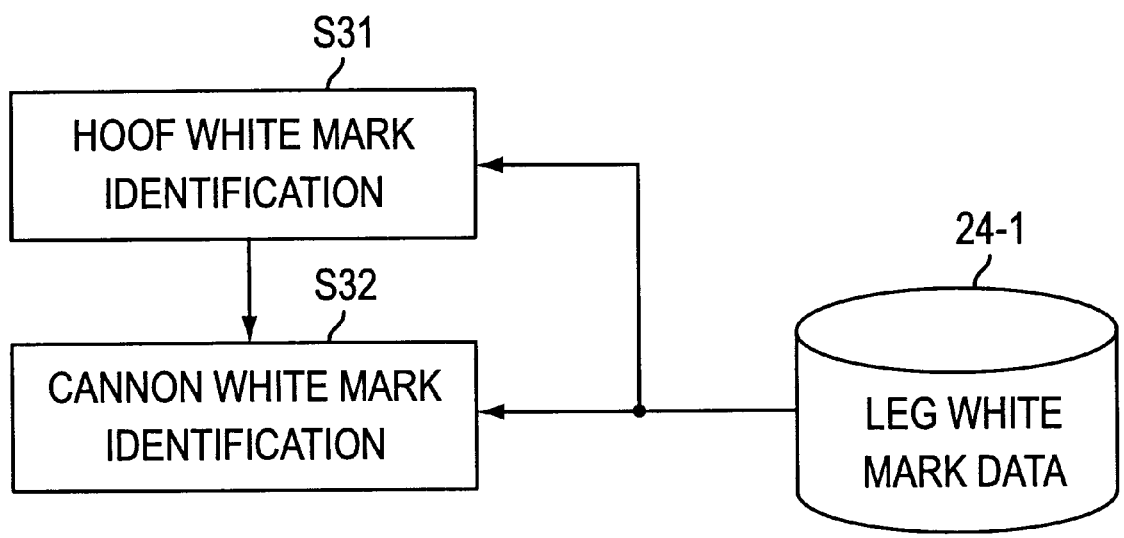
FIG. 25 is a flowchart showing the processes of the leg white marks identification unit 24 in FIG. 11.
Figure 26:
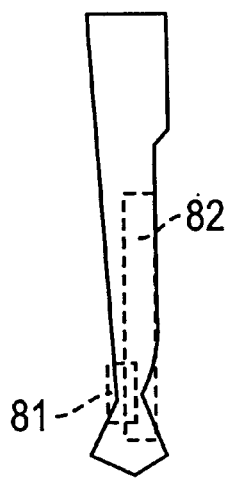
FIG. 26 is a diagram showing the data extraction regions in FIG. 25.

FIG. 25 is a flowchart showing the processes of the leg white mark identifier 24 in FIG. 11, FIG. 26 is a diagram showing the extraction regions in FIG. 25, and FIG. 27 is a diagram showing the names of white marks on the legs.

The leg white mark identifier 24 refers to the leg white mark data 24-1 stored in memory, not shown, extracts the white regions from the image from the image input unit 19, analyzes the image by the processes S31 and S32 in FIG. 25, obtains the names defined according to variations of the leg white patterns as external appearance data of the horse, and outputs as a result of let white mark identification. The names of white marks in FIG. 27 are stored in data on leg white marks 24-1 along with the location and size of the white mark.

In the hoof white mark identification process S31 in FIG. 25, the left white mark identifier 24 extracts the white mark in the region 81 at the hoof in FIG. 26, measures its size and circumference length, and selects a right name for data on leg white mark 24-1. For example, if the area of the white mark is small, "tiny white" is selected. In the leg white mark identification process S32, the leg white mark identifier 24 extracts the white mark in the leg region 82 in FIG. 26, measures the size and the circumference length of the white region, and selects a right name for data on leg white mark 24-1.

Figures 28, 29:
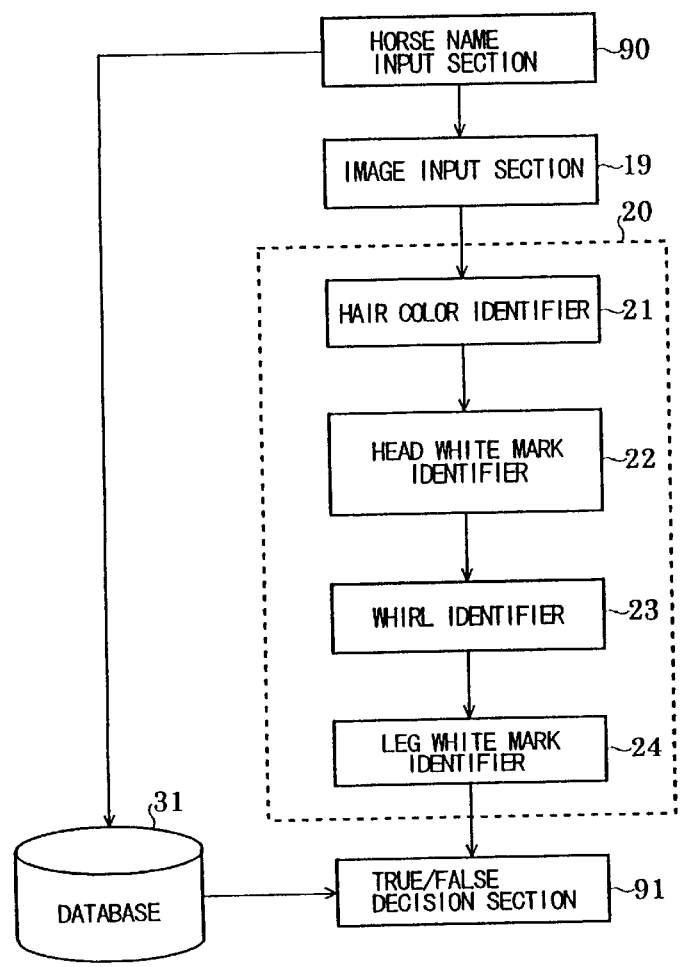
FIG. 28 is a diagram showing the horse names and the feature names accumulated in the database 31 in FIG. 11.
FIG. 29 is a block diagram of the individual identification system showing a fourth embodiment of the present invention.

FIG. 28 is a diagram showing a horse's name and its feature stored in database 31 in FIG. 11.

The horse name output unit 30 searches the database 31 by a feature name selected by the image analysis means 20. A plurality of horse names are associated with the features of the horses when they are stored in the database 31. Therefore, by searching the database 31 by the names of features selected by the image analysis means 20, the name of the horse under identification can be obtained. For example, when the names of features selected and extracted by the portions 21 to 24 of the image analysis means 20 are "kurige" (chestnut), "shooting star nose-bridge white", "shumoku" and "right front small white", the name of the horse is obtained as "abcdef."

The individual identification system comprises an image input unit 19 for taking images of a horse H under identification and acquiring images of the horse, image analysis means 20 for extracting the external features peculiar to the horse, such as the fur color, head white mark, whirls, leg white mark from the image, and a horse name output unit 30 for obtaining the name of the horse H by searching the database 31. Therefore, it becomes possible to prevent the features from being overlooked, and preclude wrong decisions, such as misjudgment, so that steady identification of horses can be performed without relying on the skill of the operator.

Since the features are assigned feature names and compared, the features of the horses can be easily stored in database 31 and measurements of horses can be obviated, which were required previously. Furthermore, a far smaller storage capacity is required of database 31 than in the prior art in which a plurality of images of a horse were stored.

Embodiment 4

FIG. 29 is a block diagram of the individual identification system according to a fourth embodiment of the present invention.

This individual identification system comprises the image input unit 19, the image analysis means 20 and the database 31 like in the third embodiment, and further includes a horse name input unit 90 and a true/false decision unit 91, which are not used in the preceding embodiments. The true/false decision unit 91 is provided in place of the horse name output unit 30 in the third embodiment, and is connected to the output side of the image analysis means 20, and also to the output side of the database 31. The horse name input unit 90 is adapted to supply the horse names to the database 31.

In the third embodiment, if the name of the horse H under identification is not known, by extracting the features from the images taken, the name of the horse is found. In the individual identification system according to the fourth embodiment, when the name of the horse to be identified is already known, while pictures are being taken, a decision is made whether or not this horse coincides with the horse H under identification.

Regarding this individual identification system, description will be made of the process in which a decision is made of whether or not this horse corresponds to the horse H under identification.

First of all, the name of the horse to be identified is input to the horse name input unit 90. The horse name input unit 90 sends the supplied horse name to the database 31 directing it to search the names of features corresponding to the name.

On the other hand, the image input unit 19 and the image analysis means 20, by the same processes as in the third embodiment, select the names of features as the external appearance data of the horse H to extract the features.

The true/false decision unit 91 compares the feature names of the horse H fetched from the database 31 with the feature names supplied from the image analysis means 20, and if they coincide or are mutually close, outputs information that the horse H under identification in the process of picture taking corresponds to the horse whose name was input to the horse name input unit 90. Or if they do not coincide, the true/false decision unit 91 outputs information that the horse does not correspond to the horse the name of which was input to the horse name input unit 90.

As has been described, the individual identification system according to the fourth embodiment, which includes the image input unit 19 and the image analysis means 20 and which is further added with the horse name input unit 90 and the true/false decision unit 91, can decide whether or not the horse under identification by comparing the features from the input image and the features obtained by inputting the horse's name when the name is known. As a result, time required for searching data for identification of the horse can be reduced substantially.

The present invention is not limited to the above embodiments but various modifications are possible. Possible modifications are as follows.

(1) In the image analysis means 20 according to the above embodiments, the fur colors, the head white patterns, whirl locations, or the leg white patterns are extracted, which represent the physical features of the horse H, and the names of the features are stored in the database 31. However, some arrangement may be done such that the scars and other marks may be extracted by image analysis and searched on the database 31.

(2) In the third embodiment, database 31 is organized such that a horse's name is obtained from the external physical features of the horse, but data used for retrieval of a horse's name may include the registration number, date of birth, blood type, pedigree registration, breed (e.g., thoroughbred male), producer, producer's address, producing district, father's name, mother's name, etc.

(3) In the foregoing embodiments, description has been made of the individual identification system for a horse H, but this invention may obviously be applied to other animals so long as the animal has similar external features to those of the horses, and may further be applied to things other than animals by using other external features and names.

As has been described, according to the third embodiment, the individual identification system is formed by the output device including the image input unit for inputting images of an individual under identification, which are taken from different angles; image analysis means for extracting the features of an individual under identification obtained by image analysis of the input image; and an output unit added with a database. Therefore, identification of an individual, a horse for example, can be performed steadily without overlooking the features.

According to the fourth embodiment, the individual identification system comprises the image input unit, the image analysis means, the name input means and the true/false decision unit, so that a decision can be made as to whether the individual under identification is true or false.

What is claimed is:

1. A system for identifying individuals, comprising:
   an image memory means for storing an input image of an individual to be identified;
   a dictionary for having data on the features of collation objects stored in advance;
   a dictionary image memory means for storing dictionary images as EL basis on which to extract data on the features of said collation objects;
   an individuals identifying means for analyzing the input image held in said image memory means and comparing said data on the features stored in said dictionary to thereby identify the individual;
   an identification result analyzing means for analyzing the identification result by said individuals identifying means and detecting that area of the region used for identification in said input image which does not agree with the dictionary data;
   a result output control means for, according to identification result by said individuals identifying means, issuing an analyze command to said identification result analyzing mean and, according to analysis result by said identification result analyzing means, issuing a command to display said area of disagreement to said identification result analyzing means, and deciding whether or not to display said input image and said dictionary image;
   an image output control means for, according to a result of decision by said result output control means, controlling display of said area of disagreement, said input image and said dictionary image; and
   a display for displaying an image output by said image output control means.

2. A system for identifying individuals according to claim 1, wherein when said input image agrees with said dictionary data to such an extent that the identification result of said individuals identifying means is larger than a preset threshold value, said result output control means makes a decision not to issue an analyze command to said identification result analyzing means nor issue a display command to said image output control means.

3. A system for identifying individuals according to claim 1, wherein said result output control means makes a decision not to issue an analyze command to said identification result analyzing means nor issue a display command to said image output control means when the identification result of said individuals identifying means even if said input image agrees with said dictionary data to such an extent that the identification result of said individuals identification means is larger than a first threshold value preset, but if said first threshold value is smaller than a second threshold value.

4. A system for identifying individuals according claim 1, wherein when said identification result analyzing means analyzes the area of disagreement between said input image and said dictionary data as larger than a preset value, said result output control means concludes that said input image generally differs from said dictionary data and makes a decision to cause only said input image to be displayed.

5. A system for identifying individuals, comprising:
   an image memory means for storing an input image of an individual to be identified;
   a dictionary for having data on the features of collation objects stored in advance;
   a dictionary image memory means for storing dictionary images as a basis on which to extract data of the features of said collation objects;
   an individuals identifying means for analyzing said input image held in said image memory means and comparing said data on the features stored in said dictionary to thereby identify the individual;
   an identification result analyzing means for analyzing the identification result by said individuals identifying means and detecting that area of the region used for identification in said input image which does not agree with said dictionary data; and
   a result output control means for making a decision not to display any image on the basis of a judgement that said input image generally differs from said dictionary data if said area of disagreement is larger than a predetermined value in the analysis of said identification result analyzing means.

6. A system for identifying individuals according to any of claim 1, wherein there is provided result output control means for making a decision to cause said input image and said area of disagreement to be displayed on the basis of a judgement that the input image partially differs from said dictionary data if the area of disagreement is smaller than a predetermined value in the analysis of said identification result analyzing means.

7. A system for identifying individuals according to any of claim 1, wherein there is provided result output control means for making a decision to cause only said area of disagreement to be displayed on the basis of a judgement that the input image partially differs from said dictionary data if the area of disagreement is smaller than a predetermined value in the analysis of said identification result analyzing means.

8. A system for identifying individuals according to any of claim 1, wherein said object to be identified is an iris in the eye.

* * * * *

UNITED STATES PATENT AND TRADEMARK OFFICE
CERTIFICATE OF CORRECTION

PATENT NO. : 6,373,968 B2
DATED : April 16, 2002
INVENTOR(S) : Kenji Okano et al.

It is certified that error appears in the above-identified patent and that said Letters Patent is hereby corrected as shown below:

<u>Title page,</u>
Item [75], after "Kuno" insert -- Yoshitaka Hirogaki, Tokyo, Japan --.

Signed and Sealed this

Tenth Day of September, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,373,968 B2
DATED : April 16, 2002
INVENTOR(S) : Kenji Okano et al.

It is certified that error appears in the above-identified patent and that said Letters Patent is hereby corrected as shown below:

This certificate supersedes Certificate of Correction issued September 10, 2002. The Certificate of Correction was withdrawn and should be vacated.

Signed and Sealed this

Twenty-fourth Day of December, 2002

JAMES E. ROGAN
*Director of the United States Patent and Trademark Office*